(12) United States Patent
Michener et al.

(10) Patent No.: US 11,859,985 B2
(45) Date of Patent: Jan. 2, 2024

(54) MAP DATA VALIDATION USING KNOWLEDGE GRAPHS AND RANDOMNESS MEASURES

(71) Applicant: Lyft, Inc., San Francisco, CA (US)

(72) Inventors: Barak Michener, Berkeley, CA (US); Thomas Michael Dedeco, Brisbane, CA (US); Albert Yuen, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 836 days.

(21) Appl. No.: 16/547,276

(22) Filed: Aug. 21, 2019

(65) Prior Publication Data

US 2021/0055112 A1 Feb. 25, 2021

(51) Int. Cl.
*G01C 21/32* (2006.01)
*G06F 16/29* (2019.01)
*G06N 5/04* (2023.01)
*G06N 5/02* (2023.01)
*G01C 21/34* (2006.01)

(52) U.S. Cl.
CPC ............. *G01C 21/32* (2013.01); *G01C 21/34* (2013.01); *G06F 16/29* (2019.01); *G06N 5/02* (2013.01); *G06N 5/04* (2013.01)

(58) Field of Classification Search
CPC ...... G01C 21/32; G01C 21/34; G01C 21/387; G06F 16/29; G06F 16/9024; G06N 5/02; G06N 5/04; G06N 5/022
See application file for complete search history.

(56) References Cited

U.S. PATENT DOCUMENTS

| | | | |
|---|---|---|---|
| 2015/0160024 A1* | 6/2015 | Fowe | G01C 21/34 701/400 |
| 2015/0160025 A1* | 6/2015 | Konig | G08G 1/096827 701/410 |
| 2019/0258878 A1* | 8/2019 | Koivisto | G06V 10/762 |
| 2019/0293440 A1* | 9/2019 | Hasemann | G01C 21/3641 |
| 2020/0081445 A1* | 3/2020 | Stetson | G05D 1/0221 |
| 2020/0372012 A1* | 11/2020 | Averbuch | G06F 16/2379 |

* cited by examiner

*Primary Examiner* — Geepy Pe
*Assistant Examiner* — Paulo Roberto Gonzalez Leite
(74) *Attorney, Agent, or Firm* — Keller Preece PLLC

(57) ABSTRACT

Systems and methods are disclosed for improved mapping data validation using randomness measures. Methods may include receiving a map dataset that includes a plurality of map features. A knowledge graph may be generated based on the map dataset that may include nodes representing or corresponding to the map features. Nodes corresponding to map features of a particular feature type may be identified and edges connected to the identified nodes may be processed to identify a plurality of paths. A randomness measure for the particular feature type may be determined based on the plurality of paths. The randomness measure may indicate a predictability of occurrences of map features of the particular feature type in the map dataset. The randomness measure may then be compared to a second randomness measure determined based on another map dataset.

20 Claims, 18 Drawing Sheets

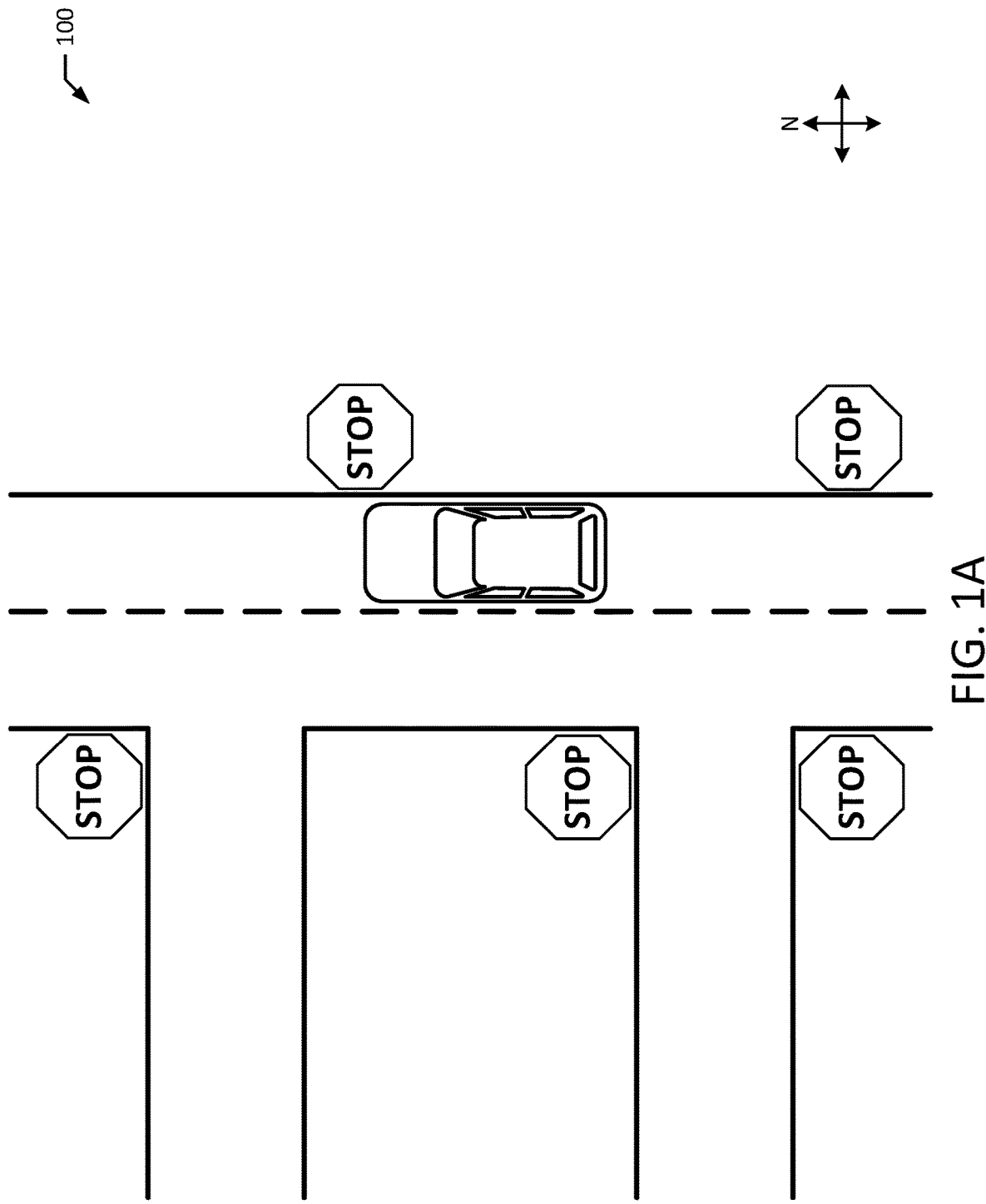

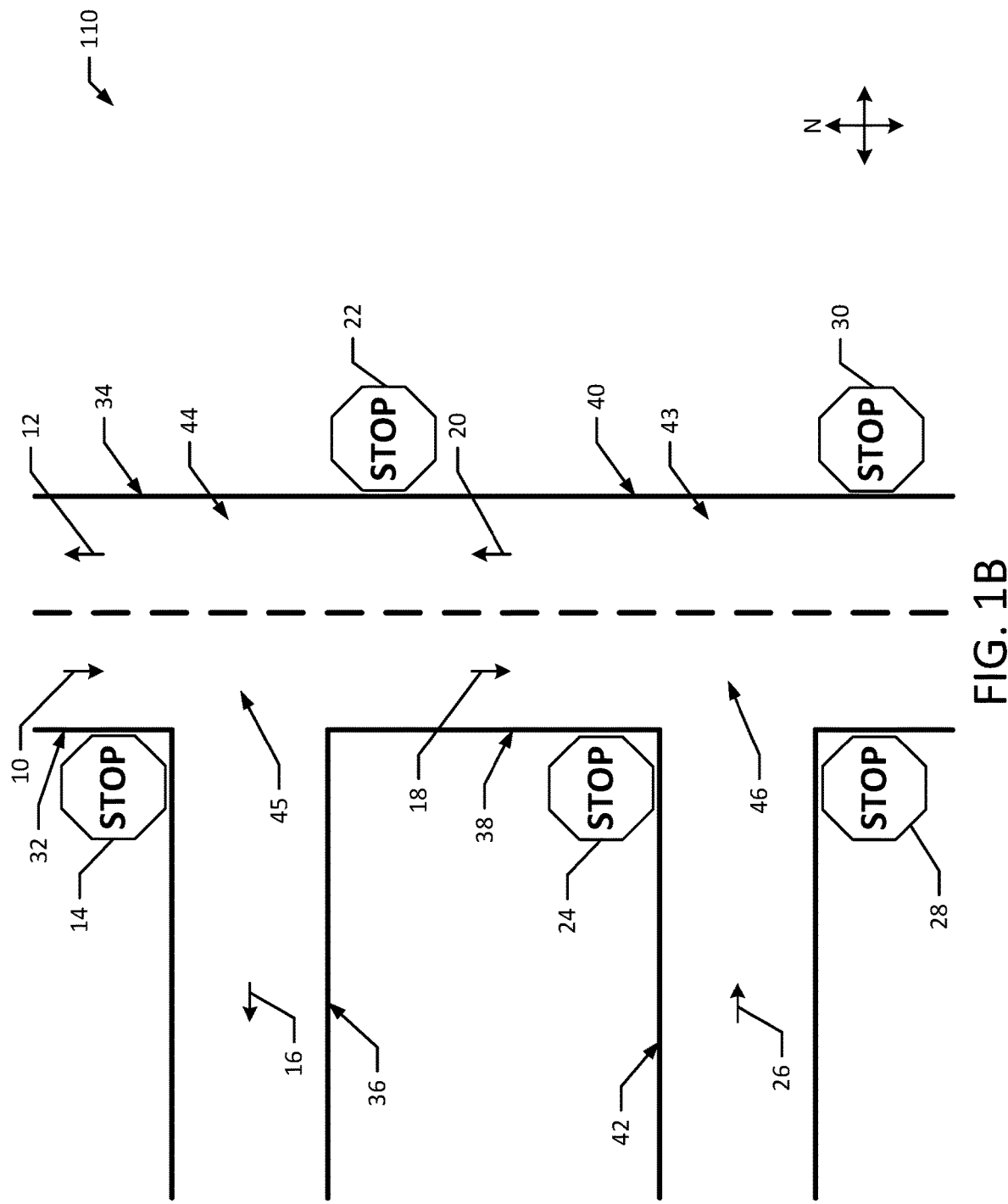

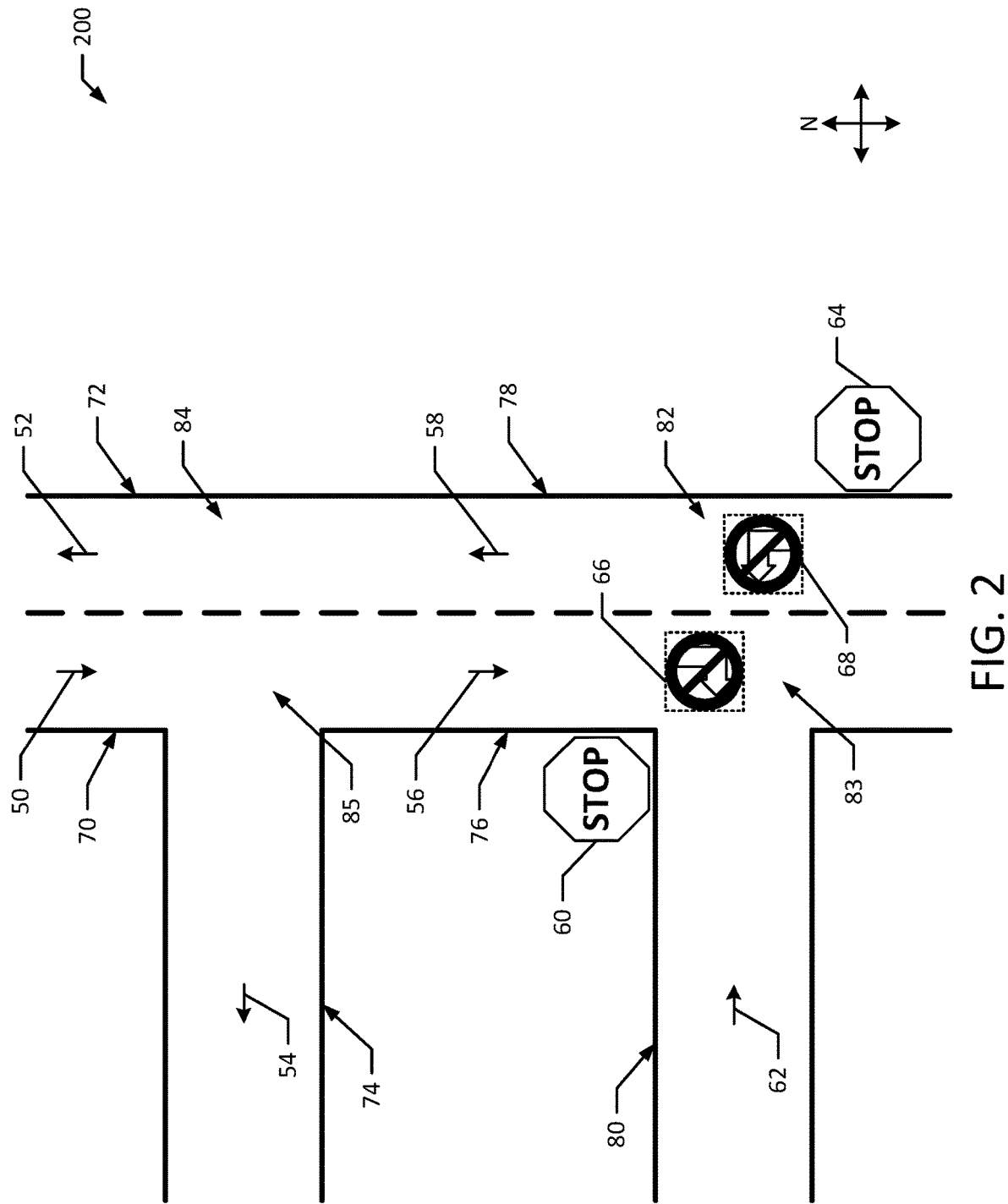

Paths Table 800

Path 802: Turn Restriction is-a ID68
Path 804: Turn Restriction is-a ID66
Path 806: Turn Restriction is-a ID68 restriction-type No Left Turn
Path 808: Turn Restriction is-a ID68 turn-restriction-for ID78
Path 810: Turn Restriction is-a ID68 is-on ID82
Path 812: Turn Restriction is-a ID66 restriction-type No Right Turn
Path 814: Turn Restriction is-a ID66 turn-restriction-for ID76
Path 816: Turn Restriction is-a ID66 is-on ID83
Path 818: Turn Restriction is-a ID68 turn-restriction-for ID78 is-a Road Segment
Path 820: Turn Restriction is-a ID68 is-on ID82 is-a Intersection
Path 822: Turn Restriction is-a ID68 is-on ID82 intersection-for ID80
Path 824: Turn Restriction is-a ID66 turn-restriction-for ID76 is-a Road Segment
Path 826: Turn Restriction is-a ID66 is-on ID83 is-a Intersection
Path 828: Turn Restriction is-a ID66 is-on ID83 intersection-for ID80
Path 830: Turn Restriction is-a ID68 is-on ID82 intersection-for ID80 traffic-direction-for ID62
Path 832: Turn Restriction is-a ID68 is-on ID82 intersection-for ID80 is-a Road Segment
Path 834: Turn Restriction is-a ID68 is-on ID82 intersection-for ID80 road-segment-type One-Way
Path 836: Turn Restriction is-a ID66 is-on ID83 intersection-for ID80 traffic-direction-for ID62
Path 838: Turn Restriction is-a ID66 is-on ID83 intersection-for ID80 is-a Road Segment
Path 840: Turn Restriction is-a ID66 is-on ID83 intersection-for ID80 road-segment-type One-Way

FIG. 8A

Filtered Paths Table 850

Path 806: Turn Restriction is-a ID68 restriction-type No Left Turn
Path 812: Turn Restriction is a ID66 restriction-type No Right Turn
Path 818: Turn Restriction is-a ID68 turn-restriction-for ID78 is-a Road Segment
Path 820: Turn Restriction is-a ID68 is-on ID82 is-a Intersection
Path 824: Turn Restriction is a ID66 turn-restriction-for ID76 is-a Road Segment
Path 826: Turn Restriction is a ID66 is-on ID83 is-a Intersection
Path 832: Turn Restriction is-a ID68 is-on ID82 intersection-for ID80 is-a Road Segment
Path 834: Turn Restriction is-a ID68 is-on ID82 intersection-for ID80 road-segment-type One-Way
Path 838: Turn Restriction is a ID66 is-on ID83 intersection-for ID80 is-a Road Segment
Path 840: Turn Restriction is a ID66 is-on ID83 intersection-for ID80 road-segment-type One-Way

FIG. 8B

Filtered Paths Table 870

Path 850: Turn Restriction → One-Way
Path 852: Turn Restriction → Two-Way
Path 854: Turn Restriction → One-Way
Path 856: Turn Restriction → Two-Way
Path 858: Turn Restriction → One-Way
Path 860: Turn Restriction → One-Way
Path 862: Turn Restriction → Parking Lot Entrance
Path 864: Turn Restriction → One-Way

FIG. 8C

MAP DATA VALIDATION USING KNOWLEDGE GRAPHS AND RANDOMNESS MEASURES

BACKGROUND

Accurate road and/or route mapping data is essential for many location-based applications. For example, mapping data is often used by location-based applications to: 1) calculate an estimated time of arrival (ETA) to a location (e.g., while an individual is in transit); 2) calculate an estimated time of departure (ETD) from a location (e.g., while an individual is waiting to be picked up for transportation); and/or 3) generate routing and/or transport decisions between locations (e.g., the actual route traveled between picking an individual up and dropping an individual off at a destination location), among other navigational-based calculations and decisions.

Over time, the conditions or layout of roads may change, necessitating mapping data updates that reflect the new road conditions. Further, new types of data may be incorporated into road and/or route mapping data during updating. For example, new map features, such as speed limits, building locations, parking locations, turn restrictions, and/or the like, may be incorporated into existing road and/or route mapping data. Incorporating such information into mapping data may enable location-based applications to calculate or otherwise process more accurate ETAs or ETDs, more accurate pickup point determinations, speed limit advisories, etc.

SUMMARY

The present disclosure presents new and innovative systems and methods for evaluating mapping data. In one embodiment, a method is provided. The method may include receiving a first map dataset including two or more map features associated with operation of a vehicle. The first map dataset may be utilized to provide one or more navigation recommendations to a mobile device associated with the vehicle. The method may further include generating, based on the first map dataset, a knowledge graph, where the two or more map features correspond to nodes of the knowledge graph and identifying two or more nodes of the knowledge graph associated with the two or more map features, wherein the two or more map features include a subset of map features. The method may also include determining, based on the two or more nodes and the two or more map features, one or more paths within the knowledge graph and determining, based on the paths within the knowledge graph, a first entropy score for the subset of map features. The method may further include comparing the first entropy score with a second entropy score, determining that a difference between the first entropy score and the second entropy score does not exceed a first predetermined threshold, and including the subset of the map features in a second map dataset.

In another embodiment, the method further includes determining that a difference between the first entropy score and the second entropy score exceeds the first predetermined threshold and excluding the subset of the map features from the second map dataset.

In a further embodiment, the first map dataset is received from a map data provider. The method may further include determining an accuracy score corresponding to the map data provider based on the difference between the first entropy score and the second entropy score and generating, based on the accuracy score, an accuracy profile associated with the map data provider.

In yet another embodiment, generating a knowledge graph based on the first map dataset further includes identifying the two or more map features within the first map dataset and determining one or more relationships between the two or more map features. The method may also include generating, for each of the two or more map features, a node in the knowledge graph and generating, for each of the one or more of relationships, an edge between two corresponding nodes of the knowledge graph.

In a still further embodiment, the edges of the knowledge graph designate a relationship type of the relationship between connected nodes.

In another embodiment, the edge is stored as a triple comprising (i) an identification of a first node connected by the edge, (ii) an identification of a second node connected by the edge, and (iii) a relationship type of a relationship between the first and second nodes.

In a further embodiment, the first entropy score indicates a predictability of occurrences of the subset of map features in the first map dataset.

In a still further embodiment, a system is provided comprising a processor and a memory. The memory may store instructions which, when executed by the processor, cause the processor to receive a first map dataset including two or more map features associated with operation of a vehicle. The first map dataset may be utilized to provide one or more navigation recommendations to a mobile device associated with the vehicle. The memory may store further instructions which, when executed by the processor, cause the processor to generate, based on the first map dataset, a knowledge graph, where the two or more map features correspond to nodes of the knowledge graph and to identify two or more nodes of the knowledge graph associated with the two or more map features, where the two or more map features include a subset of map features. The memory may store still further instructions which, when executed by the processor, cause the processor to determine, based on the two or more nodes and the two or more map features, one or more paths within the knowledge graph and determine, based on the paths within the knowledge graph, a first entropy score for the subset of map features. The memory may also store instructions which, when executed by the processor, cause the processor to compare the first entropy score with a second entropy score, determine that a difference between the first entropy score and the second entropy score does not exceed a first predetermined threshold, and include the subset of the map features in a second map dataset.

In another embodiment, the memory contains further instruction which, when executed by the processor, cause the processor to determine that a difference between the first entropy score and the second entropy score exceeds the first predetermined threshold and exclude the subset of the map features from the second map dataset.

In a further embodiment, the first map dataset is received from a map data provider. The memory may contain further instructions which, when executed by the processor, cause the processor to determine an accuracy score corresponding to the map data provider based on the difference between the first entropy score and the second entropy score and generate, based on the accuracy score, an accuracy profile associated with the map data provider.

In yet another embodiment, the memory stores further instructions which, when executed by the processor while generating a knowledge graph based on the first map dataset, cause the processor to identify the two or more map features within the first map dataset and determine one or more relationships between the two or more map features. The memory may store still further instructions which, when executed by the processor, cause the processor to generate, for each of the two or more map features, a node in the knowledge graph and to generate, for each of the one or more of relationships, an edge between two corresponding nodes of the knowledge graph.

In a still further embodiment, the edges of the knowledge graph designate a relationship type of the relationship between connected nodes.

In another embodiment, the edge is stored as a triple comprising (i) an identification of a first node connected by the edge, (ii) an identification of a second node connected by the edge, and (iii) a relationship type of a relationship between the first and second nodes.

In yet another embodiment, the first entropy score indicates a predictability of occurrences of the subset of map features in the first map dataset.

In a further embodiment, a non-transitory computer readable storage medium is provided including instructions, executable by a processing device. The instructions may include receiving a first map dataset including two or more map features associated with operation of vehicle. The first map dataset may be utilized to provide one or more navigation recommendations to a mobile device associated with the vehicle. The instructions may further include generating, based on the first map dataset, a knowledge graph, where the two or more map features correspond to nodes of the knowledge graph and identifying two or more nodes of the knowledge graph associated with the two or more map features, wherein the two or more map features include a subset of map features. The instructions may also include determining, based on the two or more nodes and the two or more map features, one or more paths within the knowledge graph and determining, based on the paths within the knowledge graph, a first entropy score for the subset of map features. The instructions may still further include comparing the first entropy score with a second entropy score, determining that a difference between the first entropy score and the second entropy score does not exceed a first predetermined threshold, and including the subset of the map features in a second map dataset.

In a still further embodiment, the instructions further include determining that a difference between the first entropy score and the second entropy score exceeds the first predetermined threshold and excluding the subset of the map features from the second map dataset.

In another embodiment, the first map dataset is received from a map data provider and the instructions further include determining an accuracy score corresponding to the map data provider based on the difference between the first entropy score and the second entropy score and generating, based on the accuracy score, an accuracy profile associated with the map data provider.

In yet another embodiment, the instructions for generating a knowledge graph based on the first map dataset further include identifying the two or more map features within the first map dataset and determining one or more relationships between the two or more map features. The instructions may still further include generating, for each of the two or more map features, a node in the knowledge graph and generating, for each of the one or more of relationships, an edge between two corresponding nodes of the knowledge graph.

In a further embodiment, the edge is stored as a triple comprising (i) an identification of a first node connected by the edge, (ii) an identification of a second node connected by the edge, and (iii) a relationship type of a relationship between the first and second nodes.

In a still further embodiment, the first entropy score indicates a predictability of occurrences of the subset of map features in the first map dataset.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 1A illustrates an example rideshare scenario implementing a process for evaluating the accuracy of mapping data, according to an exemplary embodiment of the present disclosure.

FIG. 1B illustrates a visualization of mapping data, according to an exemplary embodiment of the present disclosure.

FIG. 2 illustrates another visualization of mapping data, according to an exemplary embodiment of the present disclosure.

FIG. 8A illustrates a paths table according to an exemplary embodiment of the present disclosure.

FIG. 8B illustrates a filtered paths table according to an exemplary embodiment of the present disclosure.

FIG. 8C illustrates another filtered paths table according to an exemplary embodiment of the present disclosure.

DETAILED DESCRIPTION OF EXAMPLE EMBODIMENTS

Figure 3:
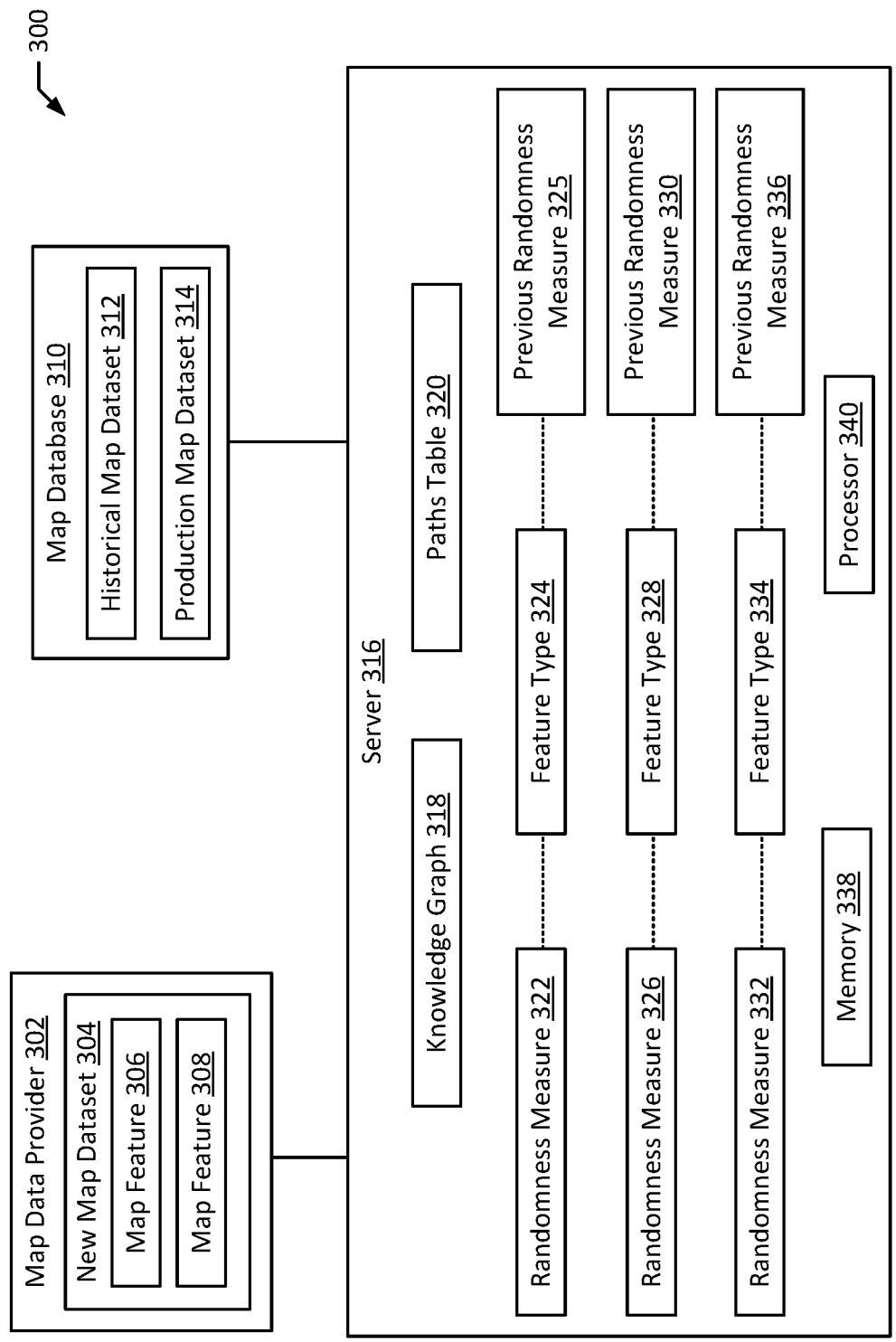
FIG. 3 illustrates a system for evaluating the accuracy of mapping data or a mapping dataset, according to an exemplary embodiment of the present disclosure.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Aspects of the present disclosure involve systems and methods that implement knowledge graphs to verify or otherwise analyze the accuracy of mapping data. Mapping data may generally provide environmental properties or details of the relationships between elements of some object or space, such as a particular geographic region (e.g., a city, state, county, country, or the like). In the specific context of a road map or a route map, mapping data may provide navigational information that displays the relationship of roads and/or transport links of a given geographic region or recognize the presence of objects in the environment of the geographic region. For example, road map and/or route map mapping data may include information corresponding to road location, road names, numbers of lanes, travel direction, information on intersections formed by one or more of the identified roads, names of intersections, identification of right or left turn lanes, speed limits, indications of the presence or absence of a traffic signal in each of the roads, points of interest, construction locations etc. In other examples, the road map and/or route map mapping data may include non-automotive transit routes, such as passenger train routes, metro routes, subway routes, bike routes, walking routes, scooter routes and associated navigational information.

In some instances, mapping data may be used by systems of location-based applications, such as transportation matching systems, to execute and display various map-based and/or navigation-based calculations and decisions for a given geographic region. For example, a transportation matching system may process a dataset of mapping data corresponding to a geographic location to generate various navigational decisions and calculations, such as ETA to a location, calculating ETD from a location, and/or generating routing decisions between locations (e.g., between picking an individual up at a particular location and dropping an individual off at a particular destination location). The map-based and/or navigation-based decisions may be provided for display at a client device associated with users of the transportation matching system or service, such as drivers, passengers, and/or the like.

As long as the mapping data the transportation matching system is processing is valid and accurate, the executable functions and processes of the transportation matching system will generate accurate navigational calculations and routing/transport decisions. In one example, any dataset of mapping data that a transportation matching system is currently processing to execute and display (e.g., at a client device) map-based calculations and decisions (e.g., to users of a transportation matching system) is referred to as a production dataset of mapping data, and such data is generally considered valid and accurate because the data was previously verified as accurate data.

Over time, however, the conditions or layout of roads and roadways of a geographic region may change, requiring updates to be made. In the example of a transportation matching system, updates may be made to the production mapping dataset that the transportation matching system may be currently processing to function (e.g., evaluate and perform calculations associated with regional environments). For example, new roads may be built after a map has already been included into the production dataset, or existing routes represented within a mapping dataset may be temporarily or permanently changed (e.g., a road may have a temporary diversion). In other examples, new feature types of map data may be identified that correspond to the geographic region, and such new data may be useful to a transportation matching system (or other type of location-based application) when making calculations and decisions, such as the routing decisions described above. For example, new map features (i.e., distinctive attributes or aspects of the map), such as speed limits, building locations, parking locations, turn restrictions, road locations, roads, traffic signals, traffic signs, vehicle locations, etc., may be identified for inclusion into a production dataset of mapping data. As yet another example, the new map features may define "points of interest" (e.g., theme parks, museums, banks or filling stations, park boundaries, river boundaries, and the like) that were previously unknown. Any such map features may be identified for inclusion into a production dataset of mapping data. Other updates and types of data may be made or incorporated to the production dataset of mapping data as well. Accordingly, to the extent a transportation matching system is executing processes based on the existing baseline/production dataset of mapping data that does not include any of such changes or new features, calculations generated by the transportation matching system may not include sufficient detail about the present or future conditions of the geographic region, or may inaccurately reflect the present or future conditions of the geographic region. In such a scenario, the production dataset of mapping data may need to be updated.

To facilitate such updates, a location-based application provider (e.g., a transportation mapping system, a mapping system provider) may obtain one or more new datasets of mapping data (e.g., from different sources) as a supplement to the existing production dataset of mapping data. For example, mapping data may be available from various sources, including open source mapping data sources (e.g., OpenStreetMap) and/or mapping data vendors (e.g., Esri® ArcGIS®). The new datasets of mapping data may be a separate mapping dataset than the production dataset or a new, updated version, of the production dataset. In some instances, different sources of mapping data may offer different types of data. For example, one mapping data source may include data identifying building locations, but may not include speed limit data, while another mapping data source may include speed limit data but may not include building location data. Therefore, it may be advantageous to combine one or more datasets of mapping data from multiple sources into a production dataset of mapping data.

However, including any dataset of mapping data into a production dataset of mapping data may present technical problems due to the accuracy of a given dataset of mapping data. For example, the accuracy of certain types of mapping data features may differ depending on the source of the mapping data and/or by location. In one specific example, certain features or type of data within a dataset of mapping data may be less accurate because the features were computer generated by a computer-generated process or system based on simulation (e.g., based on surrounding features of the mapping dataset) and without any real-world verification. Such computer-generated map features may be of minimal value to the location-based application provider because the location-based application provider could create their own computer-generated process or system to generate such map features. In such a scenario, it may be unnecessary to obtain (e.g., purchase) the new dataset of mapping data for integration into the production dataset of mapping data.

In another example, the map features of a new dataset of mapping data may include features or otherwise represent features in a manner that differs from how such features have typically appeared in the production dataset of mapping data. For example, if the production dataset of mapping data includes map feature types (e.g., speed limits) for a new geographic location (e.g., Bozeman, Mont.) that the production dataset of mapping data already includes for other, seemingly similar locations (e.g., Billings, Mont.), occurrences of the map feature types in the new location (i.e., from the new dataset of mapping data) may be compared against occurrences in the seemingly similar locations of the production dataset of mapping data. If the occurrences between the new dataset of mapping data and the production dataset of mapping data differ too much, the map feature types of the new dataset of mapping data may be determined to be inaccurate and therefore not integrated into the production dataset of mapping data. In any such scenario, the accuracy of the obtained data may be questioned.

To solve these specific technical problems, among others, the present disclosure generally discloses systems and methods that may be used for analyzing a dataset of mapping data to verify or otherwise analyze the accuracy of the mapping data before integrating or otherwise including the dataset of mapping data into a production dataset of mapping data. As will be explained in further detail below, the system may generate a knowledge graph corresponding to the dataset of mapping data and a knowledge graph corresponding to a production dataset of mapping data. The system may calculate a randomness measure for the dataset of mapping data and/or the production dataset of mapping data. Based on the calculated randomness measure(s), the system may, for example, determine that: 1) the dataset of mapping data is accurate and therefore may be acceptable for inclusion into the production dataset of mapping data; or 2) the dataset of mapping data is not accurate and therefore may be unacceptable for inclusion into the production dataset of mapping data. Upon determining that the dataset of mapping data is accurate, the dataset of mapping data may be incorporated into the production dataset of mapping data. Accordingly, within the context of a transportation matching system, the dataset of mapping data may be incorporated into the production dataset of mapping data the transportation matching system is currently processing to generate various map-based calculations and decisions.

To provide a more specific example, FIGS. 1A-1B depict an illustration associated with mapping data 110 that may be used in a rideshare service scenario 100 to generate various navigation-based calculations and decisions for display at a client device associated with users of the rideshare service, such as drivers, passengers, and/or the like. Referring initially to FIG. 1B, the mapping data 110 may represent a complete dataset of mapping data or a subset of a dataset of mapping data used by a service or location-based application or service, such as a rideshare application, provided by a transportation network company or other navigation services provider.

Referring to FIG. 1A, a transportation matching system may process the mapping data 110 to generate various navigation-based and/or map-based calculations and decisions for display to users, such as at a client device associated with a user in proximity of the depicted vehicle. For example, the transportation matching system (e.g., one or more systems or processes) may use the mapping data 110 to calculate various route and/or transport decisions and/or other transportation matching calculations and decisions, such as determining a pickup location for a passenger, generating a transport route from the pickup location to a specific destination, estimate ETA, estimate ETD, and the like.

Referring again to FIG. 1B, the mapping data 110 includes road segments 32, 34, 36, 38, 40, 42 of a road. The road segments 34, 40 represent the eastern lane of a north/south road and the road segments 32, 38 represent the western lane of the north/south road. The road segments 40, 42 intersect to form the intersection 43 and the road segments 38, 42 intersect to form the intersection 46. The road segments 34, 36 intersect to form the intersection 44 and the road segments 32, 36 intersect to form the intersection 45.

As further illustrated, the mapping data 110 includes separate intersections 43, 44, 45, 46 for each lane of the north/south road, although other implementations may use a single intersection for both lanes (e.g., the road segments 38, 40, 42 may form a single intersection that includes both lanes of the north/south road). Each road segment 32, 34, 36, 38, 40, 42 has a corresponding traffic direction 10, 12, 16, 18, 20, 26. The traffic directions 12, 20 for the road segments 34, 40 indicate a north traffic direction. The traffic directions 10, 18 for the road segments 32, 38 indicate a south traffic direction. The traffic direction 16 for the road segment 36 indicates a western traffic direction, representing a one-way road. The traffic direction 26 for the road segment 42 indicates an eastern traffic direction, representing a one-way road. The mapping data 110 also includes stop signs 14, 22, 24, 28, 30 for the road segments 32, 34, 38, 42, 40 at the intersections 45, 44, 46, 43. Such data may be used to update routing, ETA, or ETD information, as, for example, stop signs can slow the average speed of traffic along the road segments 32, 34, 38, 42, 40 and thereby increase an ETA for a ride in transit or an ETD for a waiting rider.

FIG. 2 depicts mapping data 200 which may be received or otherwise obtained from a map data provider to supplement the mapping data 110 (e.g., a production dataset of mapping data). Referring to the transportation matching example illustrated in FIG. 1B, the rideshare service provider may obtain the mapping data 200 to add new features to the mapping data 110 to cause a transportation matching system, routing system, navigation system, and/or the like to generate improved navigation calculations and decisions and/or map-based calculations and decisions. The mapping data 200 may include certain types of mapping features that are more accurate than the mapping data 110 or are not included within the mapping data 110.

Additionally, in some embodiments, the mapping data 200 may include certain types of mapping features that are less accurate than those in the mapping data 110. For example, the mapping data 200 includes road segments 70, 72, 74, 76, 78 and traffic directions 50, 52, 54, 56, 58, 62 similar to those included in the mapping data 110. Also, although the mapping data 200 includes stop signs 60, 64 corresponding to the stop signs 24, 30 of the mapping data 110, the mapping data 200 does not include corresponding data for the stop signs 14, 22, 28. The mapping data 200 may therefore include less accurate stop sign data, which should not be incorporated into the dataset of mapping data 110.

Although the dataset of mapping data 110 includes more accurate stop sign data, the dataset of mapping data 110 does include turn restrictions 66, 68, included in the dataset of mapping data 200, which indicate no right turn from the road segment 76 at the intersection 83 and no left turn from the road segment 78 at the intersection 82 (e.g., because the road segment 80 is a one-way road with a traffic direction toward the intersections 82, 83). The mapping data 200 may similarly include additional turn restrictions outside of the depicted subset, such as turn restrictions not associated with one-way roads that may be more difficult to systematically determine using a computer process or system. The disclosed system may validate these mapping features and, if determined accurate or unique, incorporate the mapping features (i.e., the additional turn restrictions) into the mapping data 110 for production use.

FIG. 3 depicts a system 300 for performing map data validation according to an exemplary embodiment of the present disclosure. The system 300 includes a map data provider 302, a map database 310, and a server 316. The map database 310 includes historical map data 312 and a production map dataset 314. The production map dataset 314 may represent mapping data used in a production setting, such as in a routing, mapping, ETA, or ETD process. The production map dataset 314 may represent a combination of datasets of mapping data, obtained from multiple mapping sources, and combined into a single dataset of mapping data 314 that includes the most accurate map features from each of the combined datasets. The production map dataset 314 may be updated based on received mapping data at regular intervals (e.g., every quarter, month, week). In certain implementations, mapping data within the production map dataset 314 may be validated on a regular basis (e.g., nightly basis).

The historical map dataset 312 may include other, previously-received mapping data (e.g., previous versions of the production map dataset 314, previous versions of the historical map dataset 312, and/or other map datasets received from other mapping data sources). As explained further below, the historical map dataset 312 may be used to validate new map datasets 304 received from map data providers 302. In one specific example, the historical map dataset 312 may represent multiple datasets, which may be stored in separate databases accessible to the server 316. The map database 310 is communicatively coupled to the server 316, which may access the historical map data 312 and the production map dataset 314 via a communications network connection (e.g., the Internet, a local area connection, wide area network, private network, cloud, etc.).

The map data provider 302 includes a new map dataset 304 that includes map features 306, 308. In one example, the new map dataset 304 may include mapping data, such as the mapping data 200, that includes certain map features 306, 308 for inclusion within the production map dataset 314 (e.g., because the map features 306, 308 are not present in the production map dataset 314 or are more accurate than the corresponding features of the production map dataset 314). The map data provider 302 may correspond to an open source map data provider, a map data vendor, and/or any other source of map datasets. The map data provider 302 is communicatively coupled to the server 316 and may provide the new map dataset 304 to the server 316 over a network connection (e.g., the Internet, a local area connection, wide area network, private network, cloud, etc.). In certain implementations, the new map dataset 304 may be provided according to an application programming interface (API) (e.g., at regular intervals, such as monthly, weekly, daily, or hourly, or upon receiving an API request from the server 316).

The map features 306, 308 may include one or more types of map features, such as road segments, traffic directions, intersections, stop sign locations, and turn restrictions as discussed above in connection with mapping data 110, 200. Additionally or alternatively, the map features 306, 308 may include one or more of the following features: annotated shapes (e.g., buildings, parking lots), building type information, U-turn locations, toll road locations, road construction locations, road termini, traffic control equipment locations (e.g., traffic lights, signage, barriers), points of interest locations, transit stop locations, speed limits, road class information for road segments, road lengths for road segments, lane counts for road segments, bike lane counts for road segments, right turn lane locations, and left turn lane locations. Other types of map features may be apparent to one skilled in the art in light of the present disclosure, and such map features are expressly contemplated.

The server 316 may be configured to receive the new map dataset 304 and to validate whether one or more of the map features 306, 308 are accurate enough for inclusion within the production map dataset 314. In particular, and as will be explained further below, the server 316 may generate a knowledge graph 318 of the new map dataset 304. The nodes of the knowledge graph 318 may correspond to the map features 306, 308 of the new map dataset 304. The server 316 may traverse the knowledge graph 318 and identify paths within the knowledge graph 318, which may be stored in the paths table 320. For example, the server 316 may traverse the knowledge graph 318 from nodes corresponding to map features 306, 308 of a particular feature type 324, 328, 334 (e.g., stop signs, turn restrictions, speed limits, building locations, parking lot locations). The server 316 may traverse the knowledge graph 318 and may generate a paths table 320 separately for each feature type 324, 328, 334. Based on the generated paths table 320, the server 316 may calculate a randomness measure 322, 326, 332 for the corresponding feature type 324, 328, 334. The randomness measure 322, 326, 332 may measure the randomness with which the corresponding feature type 324, 328, 334 occurs within the new map dataset 304. The randomness measure 322, 326, 332 may then be compared to a previous randomness measure 325, 330, 336 that also corresponds to the feature type 324, 328, 334. The previous randomness measure 325, 330, 336 may be calculated based on one or both of the historical map dataset 312 and the production map dataset 314. For example, the server 316 may similarly generate a knowledge graph 318 for the historical map dataset 312 and/or the production map dataset 314 and may generate a corresponding paths table 320 for each feature type 324, 328, 334. The corresponding paths table 320 may then be used to calculate the previous randomness measure 324, 330, 336. In certain implementations, or for certain feature types, the previous randomness measure 325, 330, 336 may be previously-calculated (e.g., during a previous evaluation of a different map dataset). In such instances, the previous randomness measure 325, 330, 336 may not be recalculated to evaluate the new map dataset 304 and may instead be accessed and compared to the calculated randomness measure 322, 326, 332.

The server 316 also includes a processor 340 and a memory 338. The processor 340 and the memory 338 may implement one or more aspects of the server 316. For example, the memory 338 may store instructions which, when executed by the processor 128, may cause the processor 128 to perform one or more operational features of the server 316. Similarly, although not depicted, one or both of the map data provider 302 and the map database 310 may include a processor and a memory storing instructions which, when executed by the processor, cause the processor to implement one or more operational features of the map data provider 302 and the map database 310.

Figure 4:
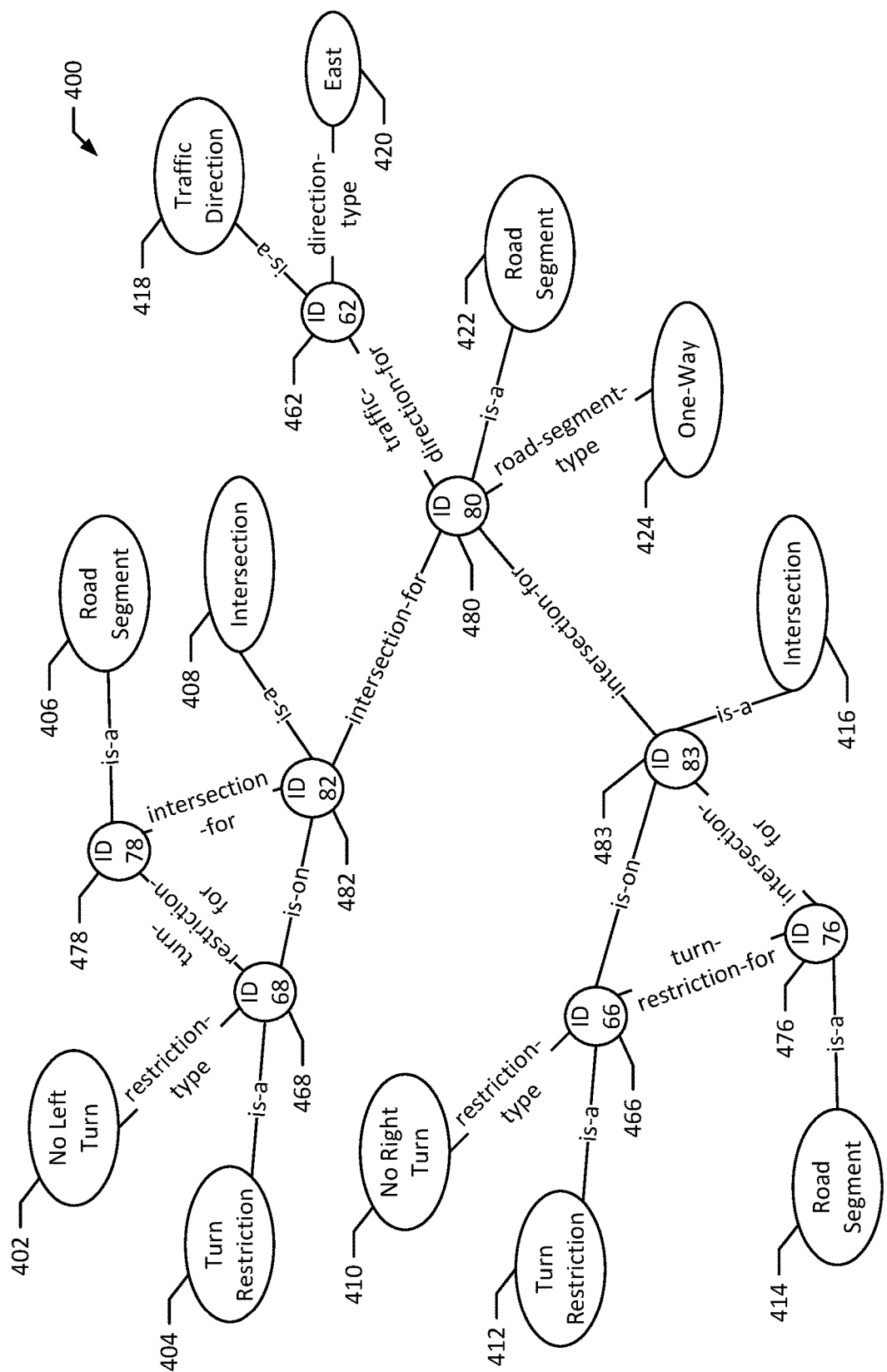
FIG. 4 illustrates a knowledge graph according to an exemplary embodiment of the present disclosure.

FIG. 4 depicts a knowledge graph 400 according to an exemplary embodiment of the present disclosure. The knowledge graph 400 may be an implementation of the knowledge graph 318 generated by the server 316. For example, the knowledge graph 400 may represent a portion of the knowledge graph 318 generated by the server 316 in response to receiving a new map dataset 304 representing the mapping data 200. In particular, the knowledge graph 400 may represent a portion of the knowledge graph 318 corresponding to the road segments 76, 78, 80 and the intersections 82, 83 of the mapping data 200.

Each of the map features 306, 308 of the mapping data 200 is represented as a node on the knowledge graph 400, represented by an ID number (e.g., ID 68 of the node 468 corresponds to the turn restriction 68). In particular, the nodes 462, 466, 468, 476, 478, 480, 482, 483 represent, respectively, the traffic direction 62, the turn restriction 66, the turn restriction 68, the road segment 76, the road segment 78, the road segment 80, the intersection 82, and the intersection 83. The knowledge graph 400 also includes other nodes 402, 404, 406, 408, 410, 412, 414, 416, 418, 420, 422, 424 that represent values corresponding to the nodes 462, 466, 468, 476, 478, 480, 482, 483. Such nodes 402, 404, 406, 408, 410, 412, 414, 416, 418, 420, 422, 424 may be considered as terminal nodes. In certain implementations, terminal nodes of the same value may be implemented by a single node. For example, nodes 406, 414, 422 may be represented by a single node including the value "Road Segment." The nodes 402, 404, 406, 408, 410, 412, 414, 416, 418, 420, 422, 424, 462, 466, 468, 476, 478, 480, 482, 483 are connected by edges. The edges connect two nodes 402, 404, 406, 408, 410, 412, 414, 416, 418, 420, 422, 424, 462, 466, 468, 476, 478, 480, 482, 483 and may designate a relationship type between the nodes, as illustrated. The depicted relationship types and corresponding definitions are provided below in Table 1, although additional relationship types are possible depending on a desired implementation and the map features 306, 308 included in the new map dataset 304.

TABLE 1

| Relationship Type | Definition |
| --- | --- |
| is-a | Identifies the type of map feature for the corresponding node |
| road-segment-type | Identifies a type of road segment (e.g., one-way road, private road, driveway, parking lot entrance). As depicted, two-way roads are not identified by a road-segment-type, but such implementations are possible according to the present disclosure. |
| intersection-for | Identifies a road segment for which an intersection map feature is an intersection |
| turn-restriction-for | Identifies a road segment for which a turn restriction map feature applies |
| restriction-type | Identifies the type of a corresponding turn restriction map feature (e.g., no left turn or no right turn) |
| traffic-direction-for | Identifies a road segment for which a traffic direction map feature applies |
| direction-type | Identifies the direction of a traffic for a corresponding traffic direction map feature |

By traversing the knowledge graph 400, the server 316 can ascertain information about the map features 306, 308 of the mapping data 200. For example, by traversing the edge connecting nodes 468, 404, it can be determined that ID68 is a turn restriction and by traversing the edge connecting nodes 468, 402, it can be determined that ID68 has a restriction type of "no left turn." Combining each of the independently indicated pieces of information, and based on the relationship definitions of Table 1, it can be determined that ID68 corresponds to a turn restriction map feature with no left turns. In some examples, the system may extend beyond individual features to incorporate additional information. For example, by traversing the nodes 468, 482, 408, the server 316 can also determine that ID68 is on ID82, which is an intersection. By further traversing nodes 478, 406, the server 316 can also determine that the ID68 turn restriction is a turn restriction for ID78, which is a road segment. The insights determined by the system can extend across the knowledge graph 400 to other map features 306, 308 by traversing the knowledge graph 400 in such a manner.

The knowledge graph 400 is depicted at a conceptual level as a two-dimensional arrangement of nodes and edges. In practice, the knowledge graph 400 may be stored in a text-based format that describes each of the edge connections between two nodes. For example, the edge connections may be stored according to a framework, such as the resource description framework (RDF). In particular, the edges may be stored as triples identifying (i) a first node, (ii) a second node, and (iii) a relationship type between (e.g., connecting) the first node and the second node. Building on this example, Table 2 depicts the knowledge graph 400 stored as triples.

TABLE 2

| Node A | Relationship Type | Node B |
| --- | --- | --- |
| ID78 | is-a | road segment |
| ID82 | is-a | Intersection |
| ID82 | intersection-for | ID78 |
| ID68 | is-a | turn restriction |
| ID68 | restriction-type | no left turn |
| ID68 | is-on | ID82 |
| ID68 | turn-restriction-for | ID78 |
| ID76 | is-a | road segment |
| ID83 | is-a | Intersection |
| ID83 | intersection-for | ID76 |
| ID66 | is-a | turn restriction |
| ID66 | restriction-type | no right turn |
| ID66 | is-on | ID83 |
| ID66 | turn-restriction-for | ID76 |
| ID80 | is-a | road segment |
| ID80 | road-segment-type | one-way |
| ID62 | is-a | traffic direction |
| ID62 | direction-type | East |
| ID62 | traffic-direction-for | ID80 |
| ID82 | intersection-for | ID80 |
| ID83 | intersection-for | ID80 |

Figure 5:
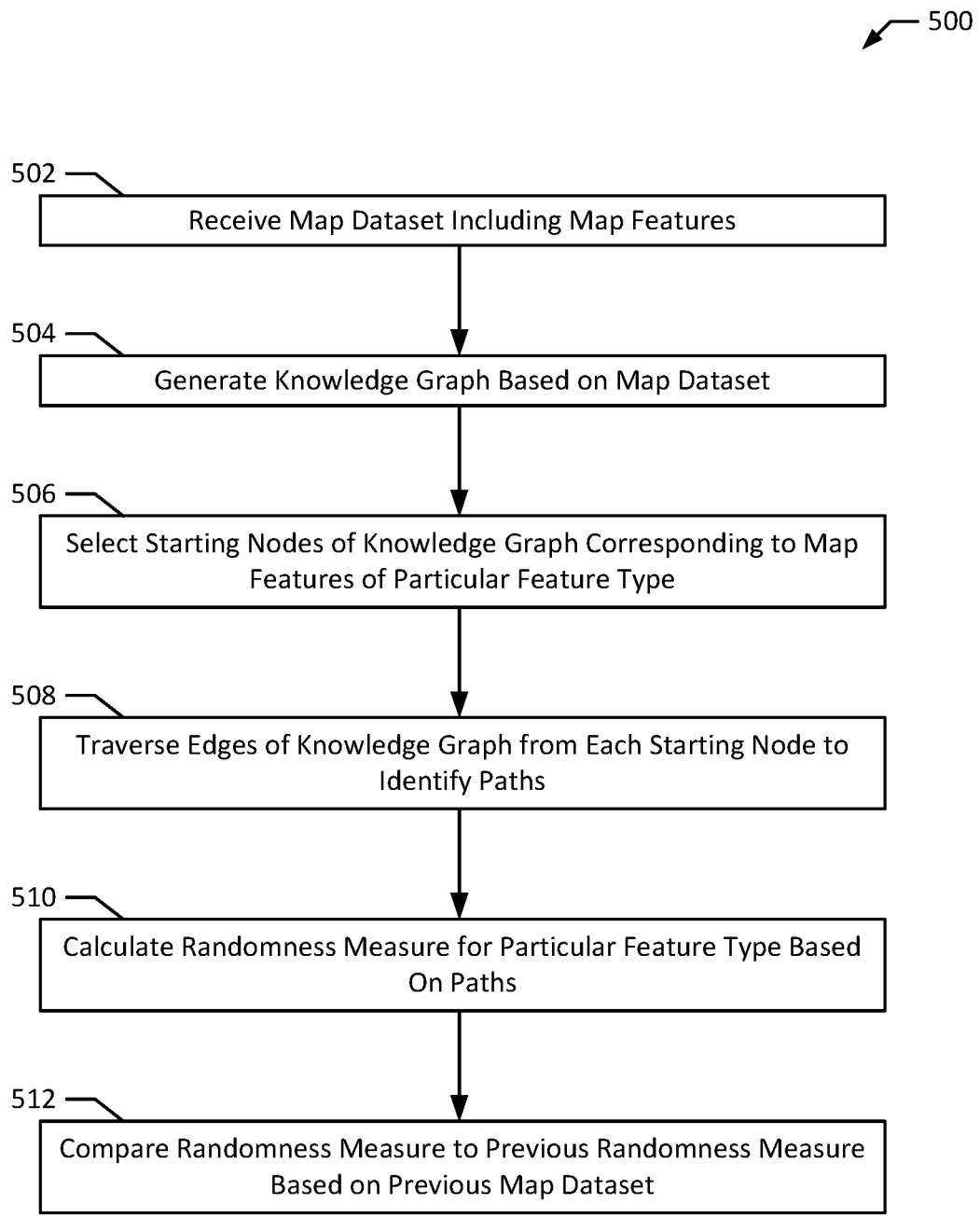
FIG. 5 illustrates a method for evaluating the accuracy of a new mapping dataset, according to an exemplary embodiment of the present disclosure.

FIG. 5 depicts a method 500 according to an exemplary embodiment of the present disclosure. The method 500 may be implemented on a computer system, such as the system 300. For example and more specifically, the method 500 may be performed by the server 316 to evaluate the accuracy of a new map dataset 304, and its corresponding features, received from a map data provider 302. The method 500 may also be implemented by a set of instructions stored on a computer readable medium that, when executed by a processor, cause the computer system to perform the method. For example, all or part of the method 500 may be implemented by the processor 340 and the memory 338. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

As illustrated, method 500 begins with the server 316 receiving a map dataset including map features (block 502). For example, the server 316 may receive a new map dataset 304 from the map data provider 302 containing map features 306, 308. As explained above, the new map dataset 304 may include map features 306, 308 for evaluation and inclusion within the production map dataset 314 (e.g., new or more accurate map features 306, 308).

The server 316 may generate a knowledge graph 318 based on the map dataset (block 504). For example, the server 316 may generate a knowledge graph 318 based on the new map dataset 304, where each map feature 306, 308 of the new map dataset 304 represents a node of the knowledge graph 318, such as the knowledge graph 400. One exemplary implementation for generating the knowledge graph 318, 400 based on the new map dataset 304 is discussed in greater detail below in connection with FIG. 9 and the method 900.

The server 316 may determine or otherwise identify specific nodes (referred to as "starting nodes") of the knowledge graph 318, 400 corresponding to map features 306, 308 of a particular feature type and from which the system may initiate traversal of the knowledge graph (block 506). The particular feature type may represent a type of map feature 306, 308 for which analysis is desired. The particular feature type may be specified by a request, such as a request received by a user (e.g., received at the server 316). For example, while evaluating the new map dataset 304, a mapping data technician may notice that the new map dataset 304 includes more turn restrictions than the production datasets (e.g., while comparing the mapping data 200 to the mapping data 110). The technician may then submit a request specifying the turn restriction feature type for further analysis. In additional or alternative implementations, the particular feature type may be specified as part of an analysis process (e.g., a standard new map dataset analysis process) that specifies one or more standard feature types for analysis. In such implementations, the particular feature type may be selected as one of the standard feature types.

The starting nodes may be selected within the knowledge graph 318, 400 as the nodes corresponding to map features 306, 308 of the particular feature type. To identify the starting nodes, the server 316 may identify the nodes within the knowledge graph with an "is-a" relationship type. As explained above, the "is-a" relationship type identifies a map feature type for the corresponding node. The server 316 may review the knowledge graph 318, 400 nodes containing the particular feature type and may identify these nodes as the starting nodes. For example, if the particular feature type is turn restrictions, the server 316 may identify the nodes 404, 412 as containing a value indicating the desired feature type (e.g., "turn restriction") and may identify these nodes 404, 412 as the starting nodes.

Figure 6A:
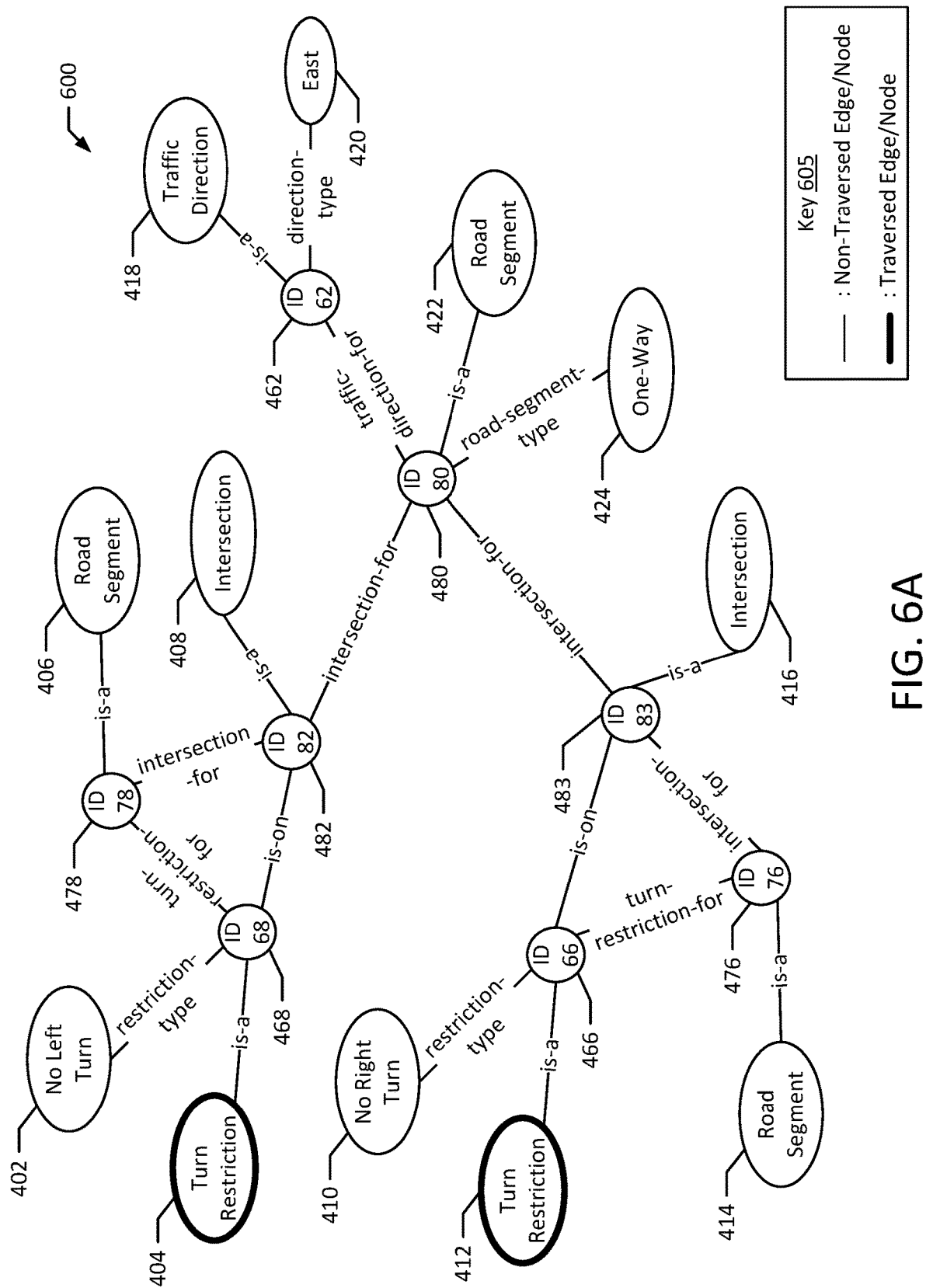
FIGS. 6A-6E illustrate a knowledge graph traversal process according to an exemplary embodiment of the present disclosure.

FIG. 6A depicts a traversal state 600 of the knowledge graph 400, indicating the nodes 404, 412 as the starting nodes. Alternatively, the server 316 may identify the nodes with a corresponding "is-a" relationship type to the nodes containing the particular feature type as the starting nodes. In such implementations, where the particular feature type is turn restrictions, the nodes 466, 468 would be identified as the starting nodes, as these nodes have an "is-a" relationship with the nodes 404, 412 containing the particular feature type (e.g., "turn restriction"). Subsequent example discussions will assume that the nodes 404, 412 were identified as the starting nodes for consistency.

Figure 6B:
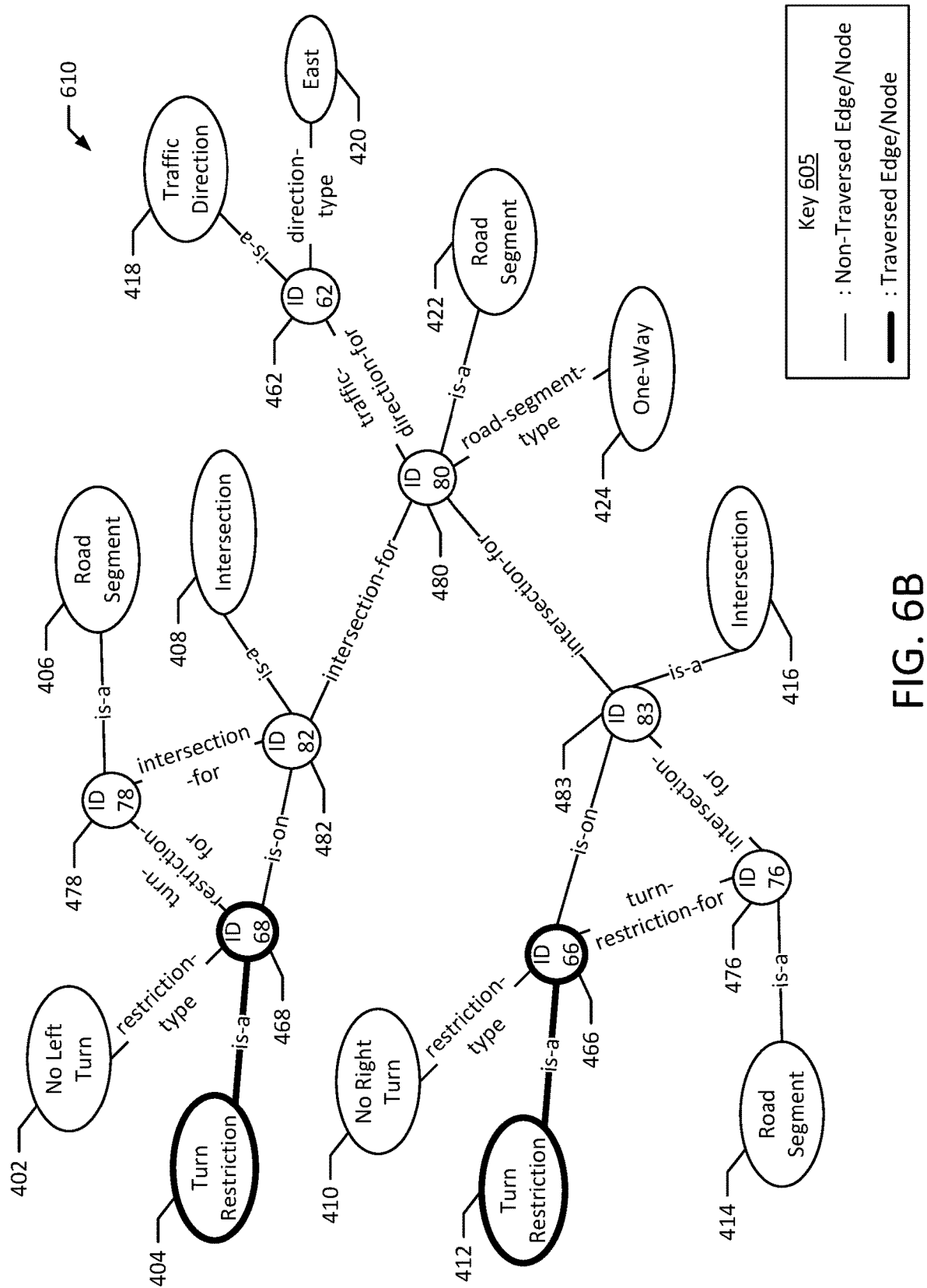

The server 316 may traverse edges of the knowledge graph 318, 400 for each identified starting node to identify paths leading from the starting nodes (block 508). To traverse the knowledge graph 318, 400, the server 316 may identify each edge leading from the starting nodes to determine the nodes that share an edge with the starting nodes. This process may repeat across multiple levels, with the nodes identified at a previous level acting as the nodes under consideration for the following level. For example, FIGS. 6A-6E depict a traversal process of the knowledge tree 400, where bolded nodes and edges indicate traversed edges and nodes and non-bolded nodes and edges indicate non-traversed edges and nodes, as shown in the key 605. As previously discussed, where the particular feature type is turn restrictions, the nodes 404, 412 may be identified as the starting nodes, indicated by the bold outline in the traversal state 600 of FIG. 6A. At the first level of traversal, the server 316 may identify the edges leaving from the starting nodes 404, 412. As depicted in FIG. 6B and traversal state 610, the identified edges connect node 404 to node 468 and connect node 412 to node 466. At this stage, the connection between these nodes may be represented as "turn restriction is-a ID68" and may be considered a path within the knowledge tree 400. Similarly, the path "turn restriction is-a ID66" may also be identified as a path within the knowledge tree 400. The traversal state 610 corresponds to a single level of traversal of the knowledge graph 400 (e.g., a single level of edge connections originating from the starting nodes 404, 412, identifying nodes 466, 468 of depth one).

Figure 6C:
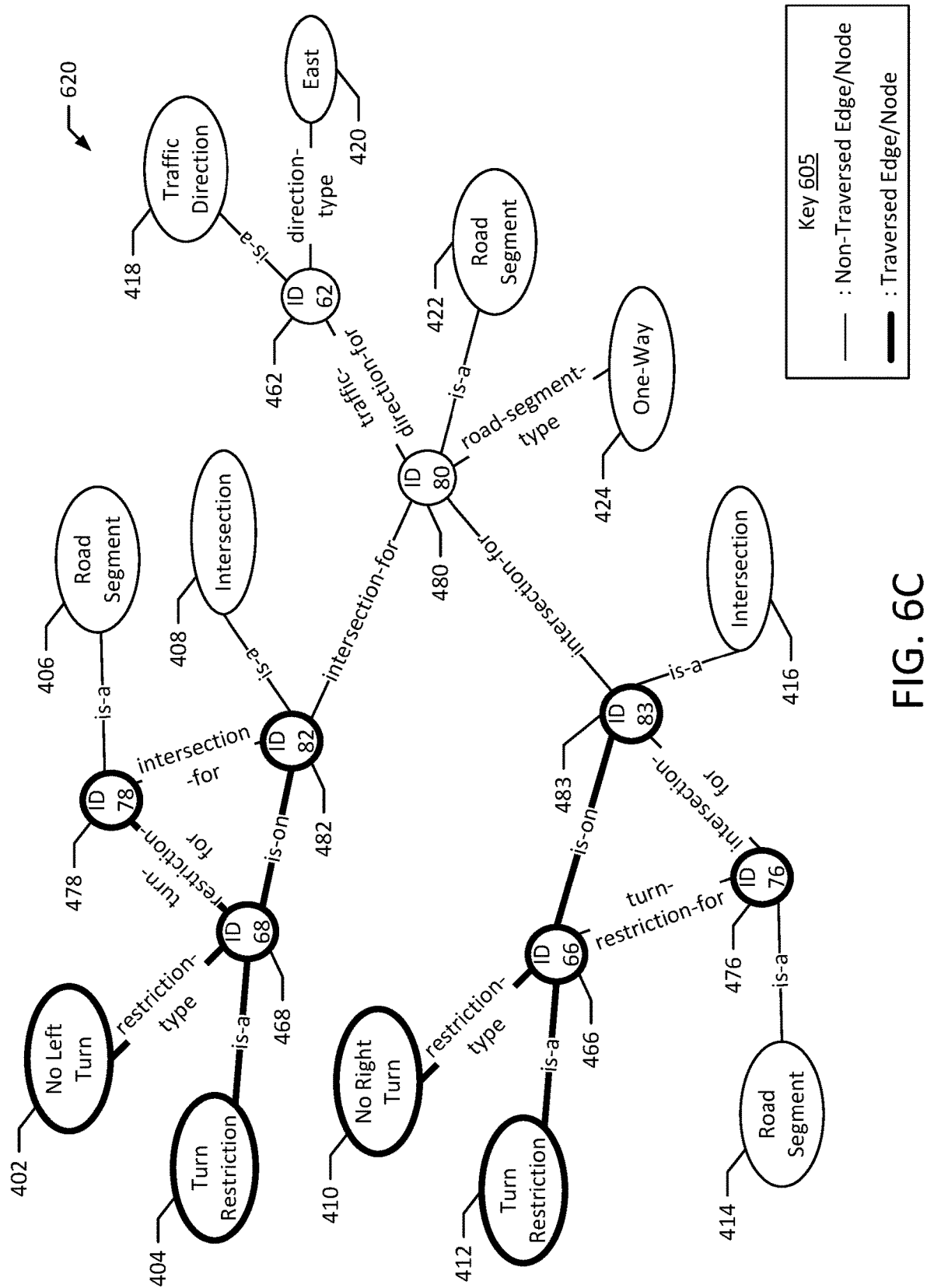
Figure 6D:
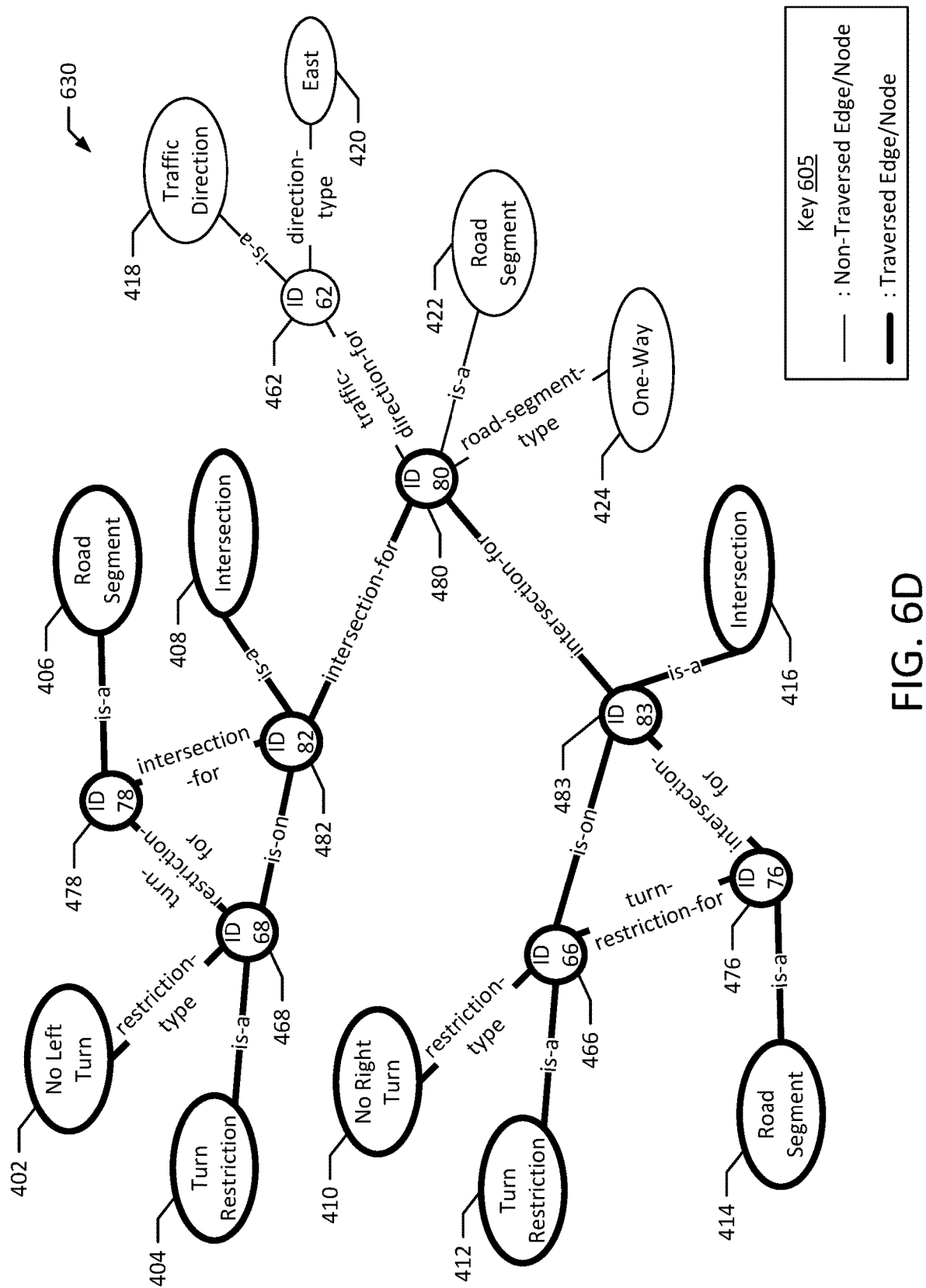
Figure 6E:
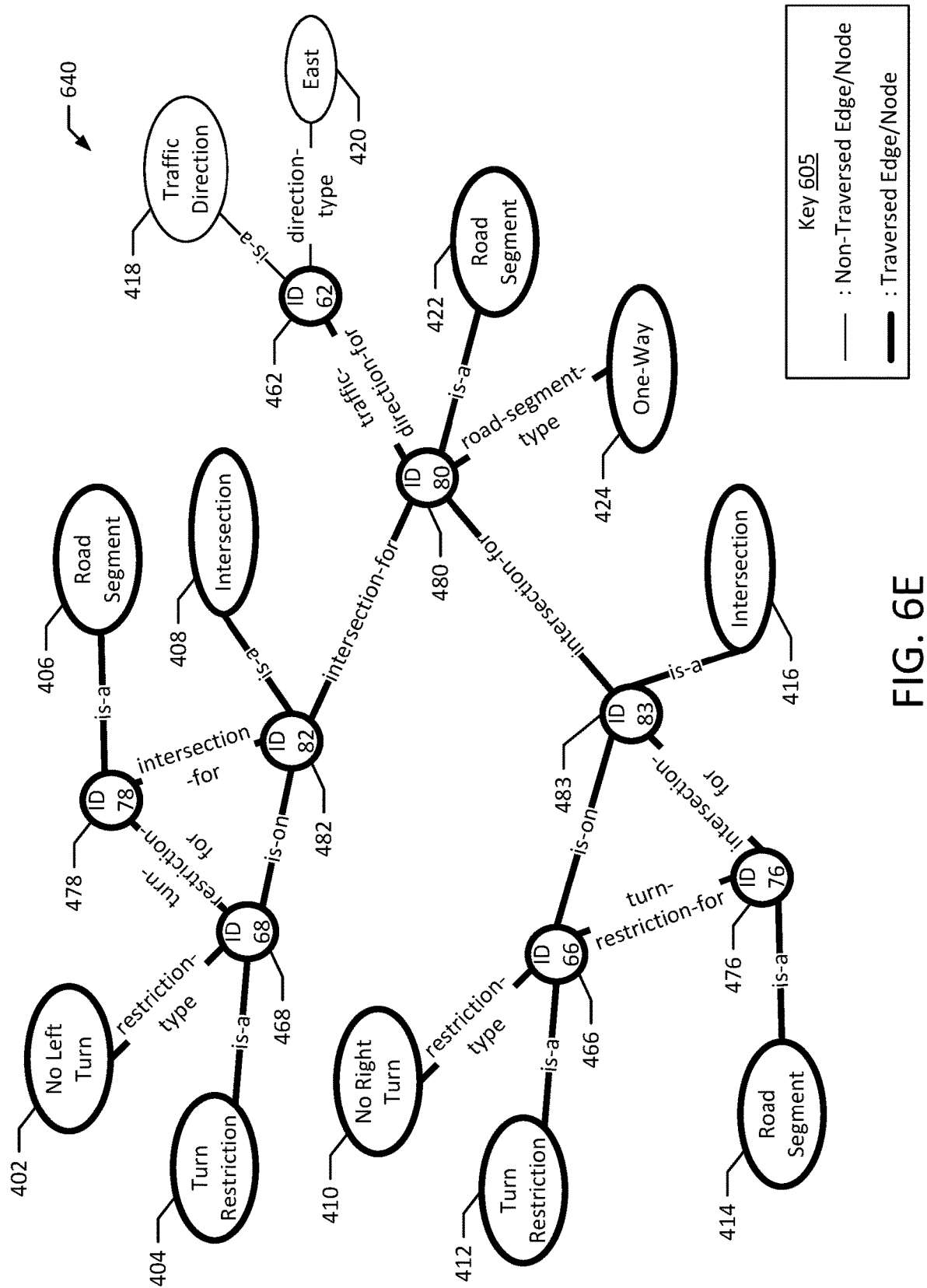

The server 316 may continue to traverse knowledge graph 400 across multiple levels. At each level, the server 316 may add to consideration nodes that share an edge with nodes at the same depth as the previous level of traversal. For example, FIG. 6C depicts a traversal state 620 corresponding to the second level of traversal of the knowledge tree 400. To perform the second level of traversal, the server 316 may identify all edges connected to the nodes 466, 468 that were added to consideration during the previous level of traversal (e.g., the nodes 466, 468 of depth one). After the first level of traversal, the nodes 466, 468 were added to consideration by virtue of their edge connections to the starting nodes 404, 412. At the second level of traversal, the server 316 may identify those nodes that share an edge with the nodes 466, 468. The server 316 may therefore identify the nodes 402, 478, 482 as sharing an edge with the node 468 and the nodes 410, 476, 483 as sharing an edge with the node 466. The nodes 402, 410, 476, 478, 482, 483 may then be considered of depth two. The nodes 402, 410, 476, 478, 482, 483 of depth two may then be considered during the third level of traversal, depicted in the traversal state 630 of FIG. 6D. In the traversal state 630, the server 316 has identified the nodes 406, 408, 414, 416, 480 as sharing an edge with at least one of the nodes 402, 410, 476, 478, 482, 483 of depth two. When traversing the knowledge graph 400, the server 316 may only identify the nodes that were not considered at a previous level of traversal (e.g., traversal states 600, 610, 620). Therefore, although there are new edges connecting nodes 478, 482 and nodes 466, 476 at the third level of traversal, these nodes 466, 476, 478, 482 may not be added to consideration, although the edges connecting them are considered traversed in the traversal state 630 to indicate that they have been considered. The server 316 may then repeat the traversal process for the fourth level of traversal, depicted in traversal state 640 of FIG. 6E. In the traversal state 640, the nodes 422, 424, 462 have been added to consideration by virtue of their shared edges with the node 480.

Traversal may continue until a traversal completion threshold is met. For example, the traversal completion threshold may specify a number of levels to be traversed (e.g., three or four levels). The number of levels for traversal may be user-specified or may be a system parameter (e.g., a parameter of the server 316). In other implementations, the traversal completion threshold may specify a maximum number of nodes or edges that can be in consideration. It should be appreciated that the number of nodes and edges, and therefore paths, in consideration may rise rapidly as the knowledge graph 318, 400 is traversed for additional levels. Accordingly, the traversal completion threshold may be selected to balance system performance and analysis time against analysis robustness and complexity. In still further implementations, the traversal completion threshold may be designated, at least in part, as a certain type of ending node. For example, traversal may continue until the identified paths end at a certain type of feature (e.g., road segments), or in a certain location (e.g., Alameda County). Additionally or alternatively, during traversal the server 316 may only consider edges of a certain relationship type (e.g., is-a or turn-restriction-for), which may correspond to paths that tend to eventually terminate within the knowledge graph 400. The specific traversal completion threshold and/or technique may be selected to include one or more of the above techniques in order to achieve desired analysis robustness and system performance.

The server 316 may accordingly identify paths within the knowledge graph 318, 400 based on the traversal process. These paths may be stored in the paths table 320 as the server 316 traverses the knowledge graph 400. For example, each time a node is added to consideration during the traversal process, the server 316 may add a corresponding path or paths from the starting node 404, 412 to the newly-added node. Continuing the previous example regarding the path connecting nodes 404, 468, when the node 478 is added to consideration in traversal state 620 by virtue of its shared edge with the node 468, the path "turn restriction is-a ID68 turn-restriction-for ID78" may be added to the paths table 320. In traversal state 630, the node 406 is added to consideration by virtue of its shared edge with node 478, which may be represented by the path "turn restriction is-a ID68 turn-restriction-for ID78 is-a road segment" added to the paths table 320. In this way, the server 316 may build out a table of paths originating from the starting nodes 404, 412 for each node added to consideration. The paths table 800 depicts paths 802-840 that may be generated during traversal of the knowledge graph 400 as depicted in FIGS. 6A-6E. In certain implementations, rather than considering the entire path 802-840, with each intermediate node ID, the paths may only consider the starting and ending nodes. For example, path 840 may be added to the table as "Turn Restriction→One-Way," with the "→" representing the internal path. Such implementations are discussed further below in connection with the filtered paths table 870.

Figure 7:
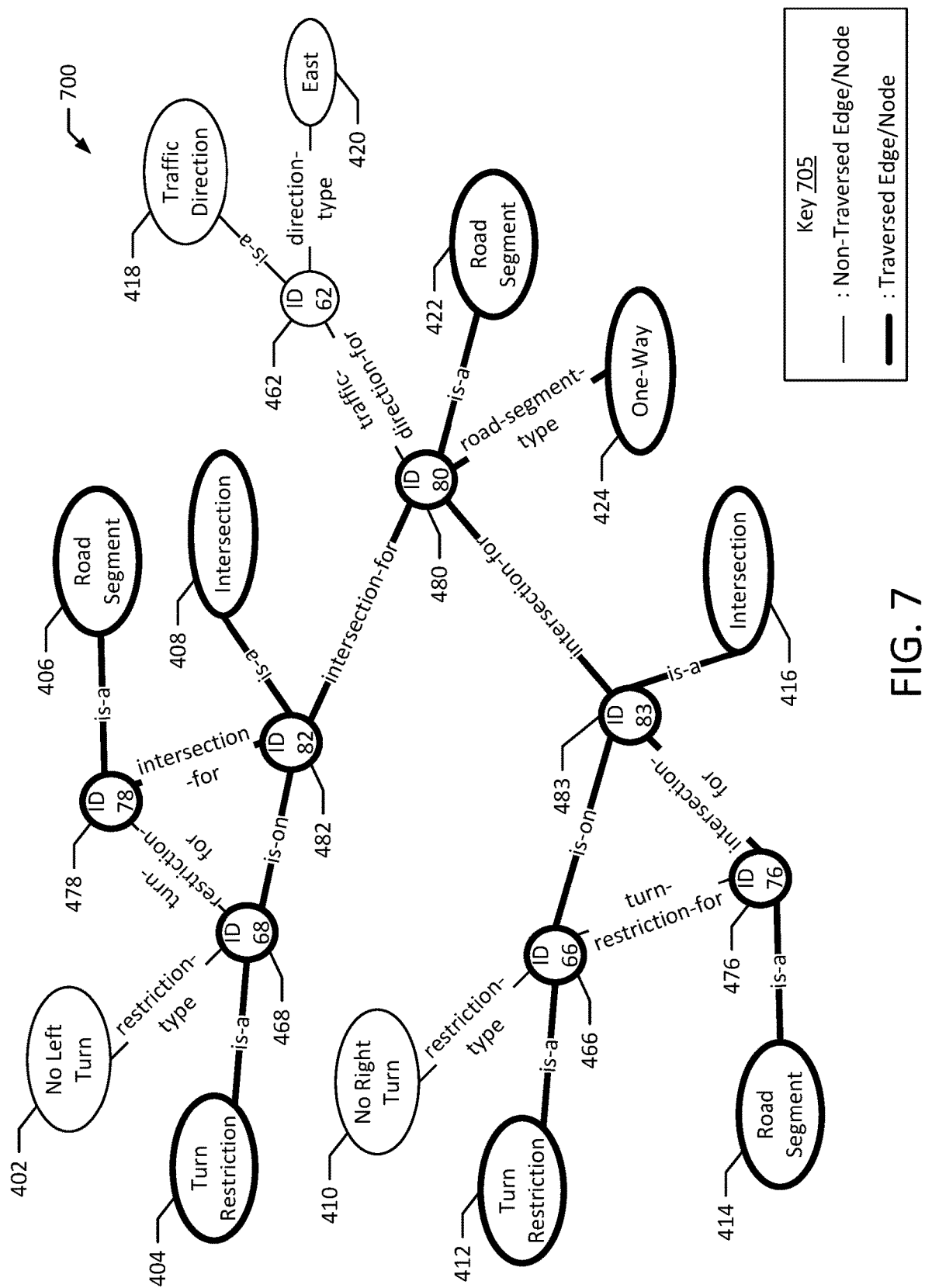
FIG. 7 illustrates a traversed knowledge graph according to an exemplary embodiment of the present disclosure.

In certain implementations, while traversing the knowledge graph 400, the server 316 may be configured to exclude edges of a certain relationship type and/or nodes of a certain type. For example, FIG. 7 depicts a knowledge graph traversal 700 that excludes relationship types of "restriction-type," "turn-restriction-for," and "traffic-direction-for." Such implementations may reduce the number of nodes added to consideration at each level, which would correspondingly reduce the overall number of nodes and edges in consideration. For example, excluding these relationship types has resulted in the nodes 402, 410, 462 being excluded from consideration, which correspondingly reduces the number of paths as compared to the traversal state 640. Similarly, excluding certain relationship types may keep irrelevant information from consideration. For example, a mapping technician providing the particular feature type of turn restrictions may be principally interested in determining whether the additional turn restrictions in the new map dataset 304 were generated by computer processes, which may suggest that they are less accurate or at least have not been verified in person (e.g., by visiting the relevant location). Such a technician may therefore be less interested in the specific type of restriction generated (e.g., no left turn or no right turn) and may instead be primarily interested in the related map features. Therefore, excluding the relationship type "restriction-type" may not exclude relevant information for the purposes of the desired analysis. Similarly, turn restrictions may almost always be located on road segments because turn restrictions relate to operation of a vehicle, unlike, e.g., building locations. Therefore, the relationship type "turn-restriction-for" may, in certain instances, be excluded with minimal loss of analytical accuracy. Lastly, if it is desired to focus analysis on certain types of roads or intersections, the relationship type "traffic-direction-for" may be excluded for the purposes of speeding up the analysis without excluding analytically relevant map features 306, 308 because traffic directions are not under consideration and are therefore not analytically relevant. Similar heuristics may be used in certain implementations to determine nodes of certain types that may be omitted. These restriction types may also differ for each level of traversal of the knowledge graph 400.

Additionally or alternatively, the server 316 may filter paths in the paths table 320, 800 after identification of paths during traversal of the knowledge graph 318, 400. For example, after creating the paths table 800, the server 316 may filter paths from the paths table 800 that do not end at a terminal node (e.g., a node for which no further edges remain, or a node containing a value). As can be seen in the traversal state 640, such terminal nodes include nodes 402, 406, 408, 410, 416, 422, 424. Paths ending at terminal nodes may improve analysis because the terminal nodes are more likely to define or provide further information on a node connected within the path (e.g., the node 424 provides additional information on the type of road segment that corresponds to node 480). FIG. 8B depicts a filtered paths table 850 corresponding to the paths table 800 after the paths 802-810, 814, 826, 822, 828, 830, 836 that do not end in a terminal node were filtered out. Other filtration techniques are also possible, including removing paths that are too short (e.g., include fewer than three nodes), paths that are too long (e.g., include more than 6 nodes), and paths that do not end in a value. Alternatively, the paths table 320, 800 may be filtered to only include certain types of paths. For example, FIG. 8C depicts a filtered paths table 870 generated based on a new map dataset 304 including road segment type information on One-Way, Two-Way, and Parking Lot Entrance road segments. The filtered paths table 870 has been filtered to only include paths 850-864 that end at a node identifying a road segment type. For simplicity, the internal portions of these paths are represented by a "→" character. In particular, while generating the filtered paths table 870, the server 316 may remove internal node IDs. For example, the path 840 in the paths table 800 is initially represented as "Turn Restriction is-a ID66 is-on ID83 intersection-for ID80 road-segment-type One-Way." The server 316 may remove the internal node identifiers and substitute them with a predicate character, such as "." or "#," or any other character to indicate removed node IDs. The path may then become "Turn Restriction is-a.is-on.intersection-for.road-segment-type One-Way." Accordingly, the "→" character may therefore represent the intermediate portions of the path (e.g., "is-a.is-on.intersection-for.road-segment-type").

Referring again to FIG. 5, the server 316 may calculate a randomness measure 322, 326, 332 for the particular feature type based on the paths identified while traversing the knowledge graph 318, 400 (block 510). Continuing the rideshare example discussed above, the randomness measure 322, 326, 332, may be calculated to see how the occurrence of map features 306, 308, of the particular feature type in the new map dataset 304 compare to occurrences in, e.g., the historical map dataset 310 and the production map dataset 314, thereby testing the accuracy of the particular feature type in the new map dataset 304. The server 316 may calculate a randomness measure 322, 326, 332 between each of the starting nodes 404, 412 and the nodes at the end of each of the paths within the paths table 320, 800 and/or the filtered paths table 850, 870. The randomness measure 322, 326, 332 may indicate a level of randomness between the particular feature type and one or more additional map features 306, 308 and/or feature types within the new map dataset 304. As an example, if the server 316 completed the traversal of the knowledge graph 318, 400 for the particular feature type of turn restrictions with the filtered paths table 820, the randomness measure 322, 326, 332 may measure the randomness between turn restrictions within the new map dataset 304 and various road segment types within the new map dataset 304. Stated differently, the randomness measure 322, 326, 332 may quantify how predictable or unpredictable occurrences of a given particular feature type will be within the new map dataset. Accordingly, in the turn restriction example, a high randomness measure 322, 326, 332 may indicate that occurrences of turn restrictions within the new map dataset 304 cannot be easily predicted, and therefore, that the presence of a turn restriction in the new map dataset 304 is a random occurrence. In such a scenario, it may be determined that the new map dataset 304 was not generated by a computer-process (which would likely be based on certain nearby map features 306, 308 and therefore be less random and predictable), but rather was generated based on random, real-world verification of the turn restrictions.

In certain implementations, the randomness measure may be calculated as the information entropy between the starting node 404, 412 and the ending node of each path 802-840 within the paths table 320, 800 and/or filtered paths table 850, 870. In particular, the randomness measure 322, 326, 332 (RM) may be calculated as:

$$RM = -\sum_i P_i \ln P_i,$$

where i represents each type of ending node (e.g., One-Way, Two-Way, Parking Lot Entrance in the filtered paths table 870) and where $P_i$ represents the proportion of paths that end in each corresponding type of ending node. For example, applying the above formulation of the randomness measure 322, 326, 332 to the paths 850-864 of the filtered paths table 870 would result in a randomness measure of:

$$RM = -[P(\text{One-Way}) * \ln P(\text{One-Way}) + P(\text{Two-Way}) *$$
$$\ln P(\text{Two-Way}) + P(\text{Parking Lot}) * \ln P(\text{Parking Lot})]$$

-continued
$$= -\left[\frac{5}{8} * \ln\frac{5}{8} + \frac{2}{8} * \ln\frac{2}{8} + \frac{1}{8} * \ln\frac{1}{8}\right]$$
$$\cong 0.9$$

For simplicity, the above example calculation was demonstrated using the comparatively smaller filtered paths table 870. However, it should be noted that the calculation can be similarly performed using more complicated paths tables, including, e.g., the paths table 800 so long as a separate probability can be determined for each ending node in the included paths. In practice, for example, a tree traversal may have, e.g., hundreds or thousands of starting nodes 404, 412 and hundreds, thousands, or millions of paths in the paths table 318, 800. The randomness measure 322, 326, 332 may be calculated across all of these paths, or across a filtered subset of these paths.

In further implementations, the randomness measure 322, 326, 332 may be calculated separately for each type of end node. For example, for the filtered paths table 870, the randomness measure 322, 326, 332 may be calculated separately for one-way roads, two-way roads, and parking lot entrances. In such implementations, the randomness measures 322, 326, 332 would be:

RM(One-Way)=−P(One-Way)*ln P(One-Way)=−⅝ ln ⅝≈0.3

RM(Two-Way)=−P(Two-Way)*ln P(Two-Way)=−²⁄₈ ln ²⁄₈≈0.35

RM(Parking Lot)=−P(Parking Lot)*ln P(Parking Lot)=−⅛ ln ⅛≈0.26

In such implementations, the randomness measure 322, 326, 332 may be separately for each type of path connecting the end nodes. For example, as explained above, the "→" character in the filtered paths table 870 may represent different intermediate portions of the depicted paths. A separate randomness measure 322, 326, 332 may therefore be calculated for each type of intermediate path. Additionally or alternatively, the types of intermediate paths may be grouped (e.g., according to the types of relationships contained in the intermediate paths), and a separate randomness measure 322, 326, 332 may be calculated for each group of intermediate paths. In still further implementations, the randomness measure 322, 326, 332 may be normalized. For example, where a single randomness measure 322, 326, 332 is calculated for all types of ending node, the randomness measure 322, 326, 332 may be normalized by the number of types of ending nodes for which the randomness measure 322, 326, 332 is calculated.

The randomness measure 322, 326, 332 may be additionally or alternatively implemented according to formulations other than the above information entropy formulation, such as formulations utilizing one or more of statistical dispersion measures of the end nodes of the paths, a diversity index of the end nodes of the paths, and mutual information measures between the starting nodes and the end nodes of the paths. In light of the above disclosure, one skilled in the art may recognize additional tests that may be used to measure the randomness of paths 802-840 identified during traversal of the knowledge graph 318, 400, and such tests are expressly contemplated by the present disclosure.

The server 316 may then compare the randomness measure 322, 326, 332 to a previous randomness measure 325, 330, 336 corresponding to the particular feature type (block 512). For example, the map database 310 may store previous randomness measures 325, 330, 336 corresponding to the randomness measure 322, 326, 332. For example, the server 316 may have previously calculated the previous randomness measure 325, 330, 336 for the particular feature type based on one or both of the historical map dataset 312 and the production map dataset 314. The previous randomness measure 325, 330, 336 may be stored within the map database 310 when the particular feature type is part of a standard set of analyses for new map datasets 304. For example, where a predefined list of feature types 324, 328, 334 are analyzed for incoming new map datasets, the previous randomness measures 325, 330, 336 may be calculated ahead of time and stored along with the historical map dataset 312 in the production map dataset 314 to expedite analysis of the new map dataset 304. In other implementations, the previous randomness measure 325, 330, 336 may need to be calculated by the server 316 while evaluating the new map dataset 304. For example, the server 316 may calculate the previous randomness measure 325, 330, 336 before or after calculating the randomness measure 322, 326, 332 of the feature type. For accurate comparisons between the randomness measure 322, 326, 332 and the previous randomness measure 325, 330, 336, the server 316 may use the same formulation when calculating the previous randomness measure 325, 330, 336 as the randomness measure 322, 326, 332 (e.g., the information entropy formulation and/or other formulations discussed above). This may be true both when the previous randomness measure 325, 330, 336 is calculated ahead of time and when the previous randomness measure 325, 330, 336 is calculated while evaluating the new map dataset 304.

Once the previous randomness measure 325, 330, 336 is obtained, the randomness measure 322, 326, 332 may be compared to the previous randomness measure 325, 330, 336. This comparison may determine whether the randomness measure 322, 326, 332 is larger or smaller than the previous randomness measure 325, 330, 336. Further examples of this comparison are discussed below in connection with FIGS. 10A and 10B.

In implementations where the randomness measure 322, 326, 332 is calculated separately for each type of ending node, the previous randomness measure 325, 330, 336 may also be calculated and compared separately for each type of ending node. For example, the one-way randomness measure 322, 326, 332 in the example above may be compared with a one-way previous randomness measure 322, 326, 332 that was similarly calculated based on the proportion of paths from turning restrictions to one-way roads in the historical map dataset 312 and/or the production map dataset 314.

The method 500 was discussed above in connection with receiving and traversing a knowledge graph 400 for a single particular feature type. In practice, however, it may be desirable to analyze more than one feature type 324, 328, 334 of a new map dataset 304. In such implementations, all or part of the method 500 may be repeated for each feature type 324, 328, 334 requiring analysis. For example, the server 316 may receive and convert the new map dataset 304 into a knowledge graph (blocks 502, 504) for analysis of the first feature type 324 and may proceed with analyzing the feature type 324 (block 506-512) as discussed above. For subsequent feature types 328, 334, the server 316 may proceed directly to analyzing the feature types 328, 334 (blocks 506-512) based on the previously-generated knowledge graph 318, 400. In other implementations (e.g., where nodes of a certain feature type or where edges of a certain relation type are excluded from the knowledge graph 318, 400), the server 316 may generate a new knowledge graph 318, 400 for each analyzed feature type 324, 328, 334. In still further implementations, the server 316 may analyze multiple feature types at the same time. For example, the method 400 may be performed to analyze both turn restrictions and one-way roads and to determine relationships between the feature types.

Figure 9:
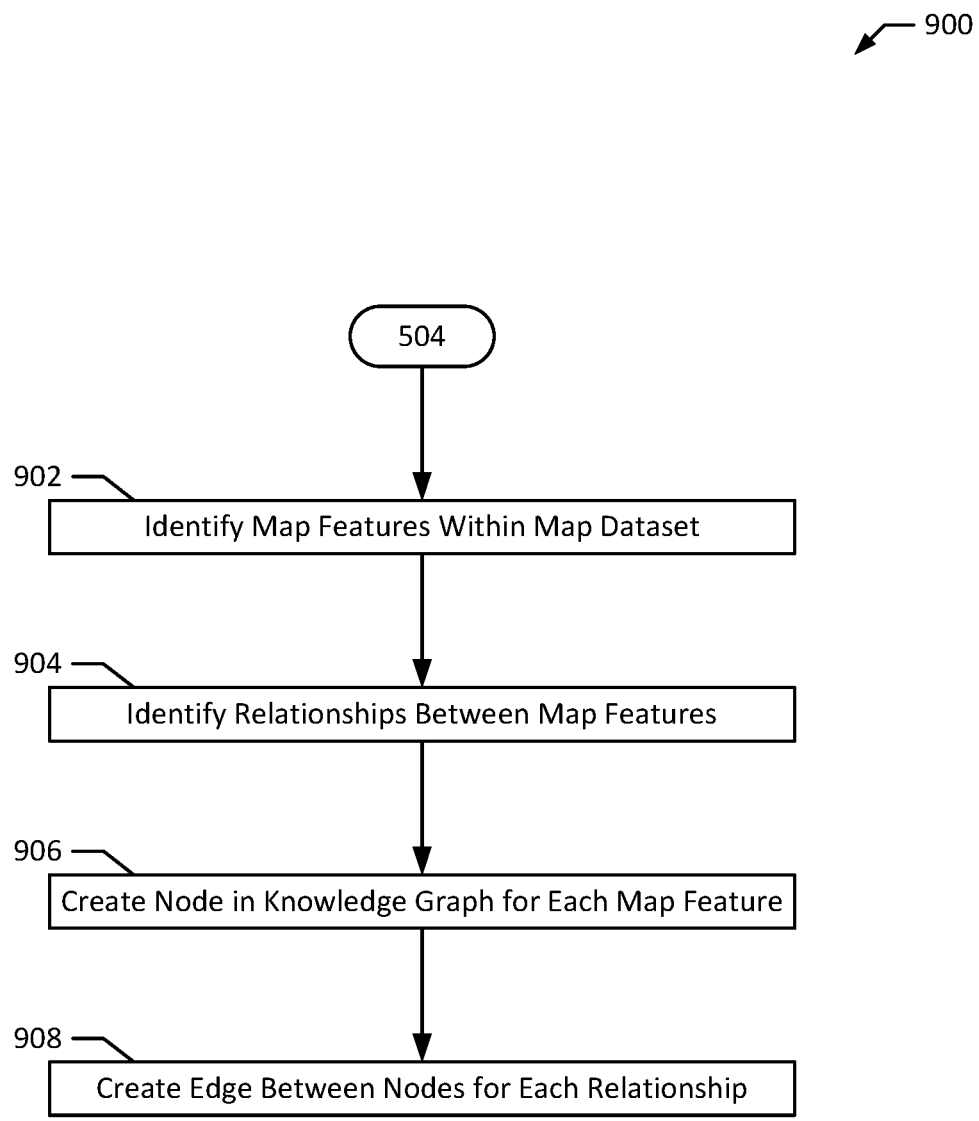
FIG. 9 illustrates a method for generating a knowledge graph, according to an exemplary embodiment of the present disclosure.

FIG. 9 depicts an exemplary method 900 for converting the new map dataset 304 into a knowledge graph 318, 400. The method 900 may be implemented on a computer system, such as the system 300. For example, the method 900 may be implemented by the server 316 to generate a knowledge graph 318, 400 based on the new map dataset 304. The method 900 may also be implemented by a set of instructions stored on a computer readable medium that, when executed by a processor, cause the computer system to perform the method. For example, all or part of the method 900 may be implemented by the processor 340 and the memory 338.

The server 316 may identify the map features 306, 308 within the received new map dataset 304 (block 902). For example, the new map dataset 304 may be received in a file format (e.g., a geographic information system (GIS) file format) that includes data regarding each map feature 306, 308 and a corresponding location or region. The server 316 may process the new map dataset 304 based on the received format to identify each map feature 306, 308 contained within the new map dataset 304.

The server 316 may identify relationships between one or more of the map features (block 904). For example, the server 316 may, for each map feature 306, 308 locate a map feature identifier within the new map dataset 304 that identifies a map feature type of the map feature 306, 308 and may thereby determine an "is-a" relationship for the map feature 306, 308 that includes the map feature identifier. In certain implementations, the server 316 may identify the relationships based on one or more common attributes (e.g., similar locations) between map features 306, 308. For example, the server 316 may also determine which map features 306, 308 are located near one another (e.g., based on location information for the map features 306, 308) to determine "is-on" and "intersection-for" relationships. In such an example, for the mapping data 200, the server 316 may determine that the turn restriction 68 overlaps locations with the road segment 78 and may therefore determine that the turn restriction 68 has a "turn-restriction-for" relationship with the road segment 78. In further implementations, the server 316 may identify relationships based on indicators other than common shared attributes. The new map dataset 304 may additionally or alternatively indicate one or more relationships between map features 306, 308. For example, the new map dataset 304 may indicate that the intersection 82 is an intersection between road segments 78, 80.

The server 316 may generate a node in the knowledge graph 318, 400 for each map feature (block 906). For example, after identifying the map features of the mapping data 200, the server 316 may generate the nodes 462, 466, 468, 476, 478, 480, 482, 483 corresponding to these map features. In certain implementations, to generate the nodes, the server 316 may assign an identifier to each node that identifies the corresponding map feature. For example, as depicted in FIG. 4, each of the nodes 462, 466, 468, 476, 478, 480, 482, 483 corresponding to map features may include an identification (ID) number for the corresponding map feature (e.g., node 468 with identifier ID68 corresponds to the turn restriction 68). In implementations where the new map dataset 304 includes feature ID numbers, these feature ID numbers may be used as the node numbers within the knowledge graph 318, 400. In other implementations, the server 316 may generate a new ID number for the nodes 462, 466, 468, 476, 478, 480, 482, 483 corresponding to map features.

The server 316 may generate an edge between nodes for each relationship (block 908). For example, the server 316 may, for each relationship identified at block 904, identify the two nodes 462, 466, 468, 476, 478, 480, 482, 483 of the knowledge graph 318, 400 corresponding to the relationship and may generate an edge between the two nodes 462, 466, 468, 476, 478, 480, 482, 483. In certain implementations, the generated edge may identify the type of relationship between the two nodes 462, 466, 468, 476, 478, 480, 482, 483. For example, after determining that the turn restriction 68 is a "turn-restriction-for" the road segment 78, the server 316 may identify the nodes 468, 478 corresponding to the turn restriction 68 and the road segment 78 and may generate an edge connecting the nodes 468, 478 with a relationship type of "turn-restriction-for." In generating the edge, the server 316 may generate a triple identifying the connected nodes and the relationship type between the connected nodes. The server 316 may then add the triple to the knowledge graph 318, 400.

The method 900 is discussed above in connection using examples of generating the knowledge graph 400 based on the mapping data 200. It should be understood, however, that the method 900 may be generalized to other received mapping data and new map datasets. Additionally, the discussions of the method 900 above refer to generating nodes for "each" map feature 306, 308 and edges for "each" relationship. In practice, similar results may be achieved by creating nodes for a subset of the map features and/or a subset of the identified relationships. For example, certain map features 306, 308 and/or relationship types may be excluded from the knowledge graph 318, 400 and therefore from subsequent analysis in the method 500 to improve processing times, as discussed above.

Also, although the examples above are described with reference to the flowchart illustrated in FIG. 9, many other methods of performing the acts associated with FIG. 9 may be used. In particular, the order of some of the blocks may be changed, certain blocks may be combined with other blocks, one or more of the blocks may be repeated, and some of the blocks described may be optional. For example, in certain implementations where the knowledge graph 318 is stored as triples, the server 316 may combine blocks 906 and 908. In such implementations, after identifying a relationship between two nodes, the server 316 may append the identified relationship as a triple to the knowledge graph 318 that identifies both nodes and the relationship (i.e., an edge between the nodes).

Figures 10A, 10B:
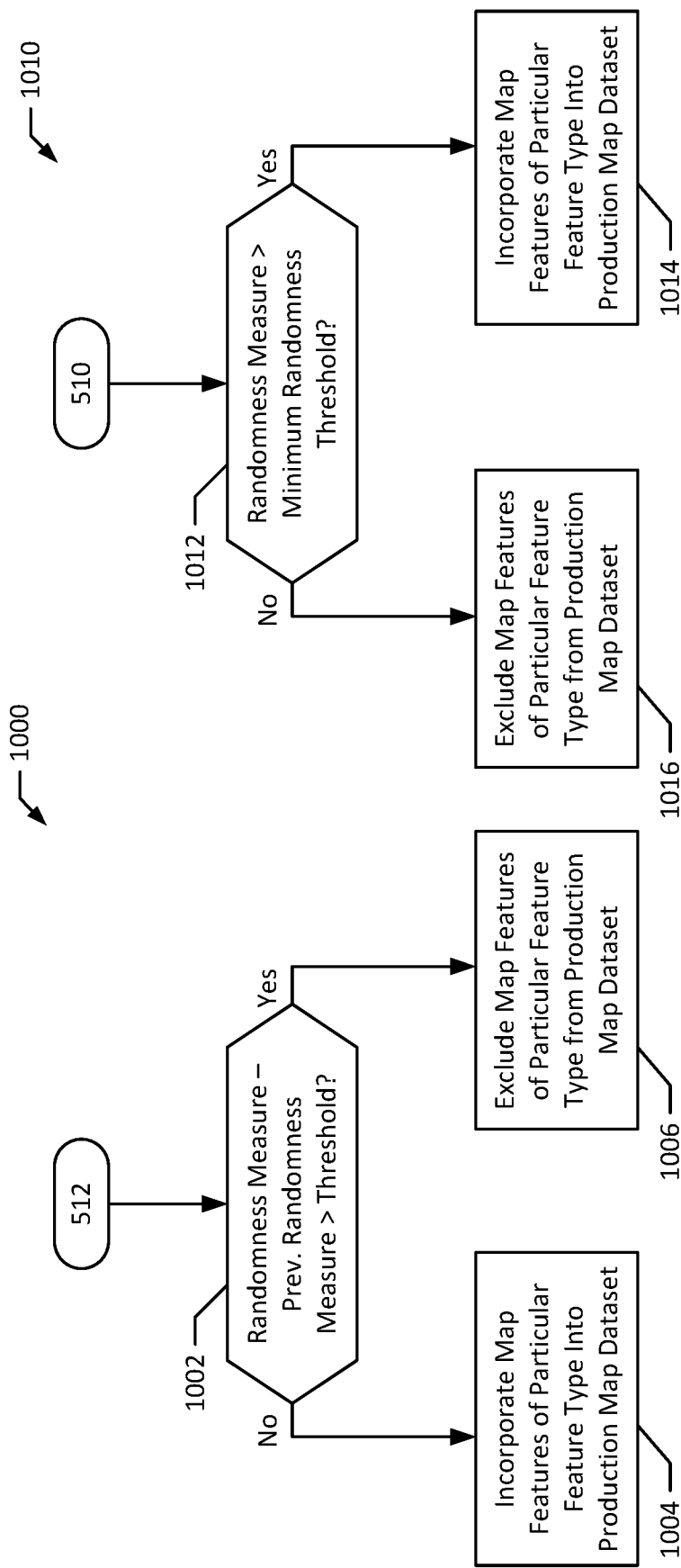
FIGS. 10A-10B illustrate methods for processing randomness measures according to exemplary embodiments of the present disclosure.

FIGS. 10A and 10B depict exemplary methods 1000, 1010 for processing the randomness measure 322, 326, 332. The methods 1000, 1010 may be implemented on a computer system, such as the system 300. For example, the methods 1000, 1010 may be implemented by the server 316 to analyze the randomness measure 322, 326, 332 and process the new map dataset 304 in light of the analysis. The methods 1000, 1010 may also be implemented by a set of instructions stored on a computer readable medium that, when executed by a processor, cause the computer system to perform the method. For example, all or part of the methods 1000, 1010 may be implemented by the processor 340 and the memory 338.

The method 1000 begins with the server 316 determining whether the randomness measure 322, 326, 332 exceeds the predetermined randomness measure 325, 330, 336 by a predetermined threshold (block 1002). The predetermined threshold may be a fixed amount (e.g., 0.05, 0.1) or a percentage of the predetermined randomness measure 325, 330, 336 (e.g., 10%, 20%). In certain implementations, the server 316 may calculate the absolute value of the difference between the randomness measure 322, 326, 332 and the predetermined randomness measure 325, 330, 336. The server 316 may then compare the absolute value of the difference to the predetermined threshold to determine whether the absolute value of the difference exceeds the predetermined threshold. Additionally, the predetermined threshold may vary on a per-feature basis. For example, the threshold for map features 306, 308 deemed more important (e.g., turn restrictions) may be smaller than the predetermined threshold for map features 306, 308 deemed less important (e.g., parking lot locations). In such implementations, the more important map features may be held to a higher accuracy standard than less important map features.

If the randomness measure 322, 326, 332 exceeds the previous randomness measure 325, 330, 336, the server 316 may determine that the corresponding feature type 324, 328, 334 occurs more randomly within the new map dataset 304 than within the historical map dataset 312 and/or the production map dataset 314. For example, in the filtered paths table 870, a majority of the turn restrictions result in paths ending at a one-way street, resulting in a randomness measure 322, 326, 332 of 0.9 in the formulation discussed above. If the production map dataset 314 includes turn restrictions that result in a previous randomness measure 325, 330, 336 of 1.5, then the difference between the randomness measure 322, 326, 332 and the previous randomness measure 325, 339, 336 is 0.9-1.5=−0.6, indicating that the new map dataset 304 includes turn restrictions that are less randomly distributed than those in the production map dataset 314. In certain implementations, such a calculation may suggest that the corresponding feature type 324, 328, 334 is less accurate within the new map dataset 304 than within the map database 310. The server 316 may therefore exclude map features of the feature type from the production map dataset 314 (block 1006).

If the randomness measure 322, 326, 332 does not exceed the previous randomness measure 325, 330, 336 by the predetermined threshold, such a calculation may suggest that the corresponding feature type 324, 328, 334 does not occur more randomly within the new map dataset 304 than within the map database 310, which may suggest that the feature types 324 are similarly accurate or more accurate within the new map dataset 304. The server 316 may therefore include map features of the feature type within the production map dataset 314 (block 1004).

Although not depicted, in certain implementations, the server 316 may also determine whether the difference between the randomness measure 322, 326, 332 and the previous randomness measure 324, 330, 336 is not less than a second threshold to ensure that the randomness measure 322, 326, 332 is not too small as compared to the previous randomness measure 324, 330, 336. If the randomness measure 322, 326, 332 is too small, the system may determine that the map features of the feature type are computer-generated based on other map features, and are thereby highly correlated with the other map features. For example, if the turn restrictions 66, 68 in the mapping data 200 were generated based on surrounding mapping features such as one-way streets, then the corresponding randomness measure 322, 326, 332 may be low in comparison to a previous randomness measure 325, 330, 336 of the production map dataset 314 (e.g., if the production map dataset 314 includes only verified turn restrictions that may also occur near two-way streets and parking lots). In certain implementations, because the turn restrictions 66, 68 in the mapping data 200 have not been verified, it may be desirable to exclude the turn restriction feature type from the production map dataset 314.

In certain implementations, the server 316 may maintain ratings of different map data providers 302. For example, different map data providers 302 may provide more accurate data for specific features types 324, 328, 334 (e.g., one map data provider 302 may provide accurate speed limit data while another map data provider 302 may provide accurate stop sign location information). The server 316 may therefore maintain ratings of the determined accuracy of map data providers 302 across multiple feature types 324, 328, 334. These ratings may be updated or initialized based on the comparison of the randomness measure 322, 326, 332 with the previous randomness measure. For example, in addition to incorporating the map features 306, 308 of the particular feature type into the production map dataset 314 at block 1004, the server 316 may update the rating of the map data provider 302 to indicate accuracy with the feature type (e.g., may increase the associated accuracy score). In another example, in addition to excluding the map features 306, 308 of the feature type from the production map dataset 314 at block 1006, the server 316 may update the rating of the map data provider 302 to indicate inaccuracy with the feature type (e.g., may decrease the associated accuracy score). In certain implementations, these ratings may be aggregated into an overall map data provider accuracy score. For example, if an overall map data provider accuracy score for a map data provider 302 is too low (e.g., below a certain threshold), new map datasets 304 from the map data provider 302 may not be incorporated into the production map dataset 314.

In still further implementations (e.g., for open source map data providers 302), the server 316 may distinguish between different editors of the map data. Open source map data may typically be edited by multiple editors, and data edited by a given editor may include an identifier of the editor. The server 316 may therefore be configured to analyze feature types 324, 328, 334 on a per-editor basis and may maintain accuracy scores (e.g., accuracy profiles) for editors across different features 324, 328, 334. Such implementations may allow for filtering on a per-editor and/or per-feature basis, thereby reducing the necessity to analyze certain map features 306, 308 within open source map data. For example, if the new map dataset 304 includes new stop sign map features from an editor with a low accuracy score for stop sign accuracy, the server 316 may exclude these map features from the production map dataset without having to calculate and analyze the randomness measure 322, 326, 332 of the new map dataset 304. In certain implementations, map features 306, 308 associated with editors with low accuracy score may also be excluded from generation of the knowledge graph 318, 400. Unreliable editors may be identified based on a randomness measure 322, 326, 332 of feature types 324, 328, 334 of map features 306, 308 that editors add to map data. For example, if one editor adds many map features 306, 308 of the same feature type, the map features 306, 308 may be analyzed using a randomness measure 322, 326, 332. A low randomness measure 322, 326, 332 may indicate that the editor has generated the map features 306, 308 using a computer process, which may be less valuable for purchase by a location-based application provider. Accordingly, an accuracy score of the editor may be reduced to indicate that features from that editor are less valuable and less reliable (e.g., less likely to have been verified in person).

The method 1010 may begin with the server 316 determining whether the randomness measure 322, 326, 332 exceeds a minimum randomness threshold (block 1012). The minimum randomness threshold may represent a minimum level of randomness for a given feature type 324, 328, 334 to be considered likely accurate. In the information entropy formulation discussed above in connection with the block 510, the minimum randomness threshold may be, e.g., 1, 0.5, 0.1, 0.01.

If the randomness measure 322, 326, 332 exceeds the minimum randomness threshold, the server 316 may incorporate the features of the particular feature type within the new map dataset 304 into the production map dataset 314 (block 1014). If the randomness measure 322, 326, 332 exceeds the minimum randomness threshold, the features of the particular feature type may be sufficiently randomly distributed throughout the new map dataset 304.

If the server 316 determines that the randomness measure 322, 326, 332 does not exceed the minimum randomness threshold, the server 316 may exclude map features of the particular feature type within the new map dataset 304 from the production map dataset 314 (block 1016). If the randomness measure 322, 326, 332 is too low, the system may determine that the feature type 324, 328, 334 is not sufficiently randomly distributed throughout the new map dataset 304. For example, if the new feature type 324, 328, 334 (e.g., turn restrictions) is sparsely distributed within the new map dataset 304, it may frequently correlate with certain other map features (e.g., one-way streets). Such a situation would result in a low randomness measure 322, 326, 332, indicating the sparse distribution and potential inaccuracy of the feature type 324, 328, 334 within the new map dataset 304. In fact, the example randomness measure calculation discussed with block 512 resulted in a randomness measure 322, 326, 332 of approximately 0.9. If the minimum randomness threshold is set at 1 as discussed above, the server 316 may then detect, based on the randomness measure 322, 326, 332, the sparsity (e.g., 8 occurrences) of turn restrictions identified in the filtered paths table 870.

In other implementations (e.g., other values for the minimum randomness threshold), a randomness measure of 0.9 may be deemed sufficient for inclusion within the production map dataset. Accordingly, if the server 316 determines that the randomness measure 322, 326, 332 exceeds the minimum randomness threshold, the server 316 may incorporate map features 306, 308 of the particular feature type into the production map dataset 314 (block 1016).

In certain implementations, the method 1010 may be performed on its own (e.g., in lieu of comparison at block 514). For example, the method 1010 may be performed after calculating the randomness measure 322, 326, 332 at block 510 as depicted. The method 1010 may also be performed in combination with the comparison with the previous randomness measure 325, 330, 336. For example, instead of incorporating the map features 306, 308 of the particular feature type into the production map dataset 314 at block 1014, the method 1010 may proceed to comparison with the previous randomness measure 325, 330, 336 (e.g., at blocks 512, 1002).

Each of the thresholds discussed above in connection with methods 1000, 1010 may differ by feature type 324, 328, 334. For example, each feature type 324, 328, 334 may have its own minimum randomness threshold and minimum threshold for comparison between the randomness measure 322, 326, 332 with the previous randomness measure 325,

330, 336. For example, stop signs may be more randomly distributed in mapping data than turn restrictions. Therefore, the minimum randomness threshold for stop signs may be higher (e.g., 4.0) than the minimum randomness threshold for turn restrictions (e.g., 0.5). Similarly, the minimum threshold at block 1002 may be higher or lower for stop signs than for turn restrictions. Depending on the implementation, the minimum randomness thresholds may range from, e.g., $\frac{1}{1,000,000}$ to 0.01, 0.1, 10, 100, or more. The thresholds for comparison with the previous randomness measure 325, 330, 336 may cover a similar range of values. As discussed above, the randomness measure 322, 326, 332 and previous randomness measure 325, 330, 336 may be calculated separately for each type of end node, or may be calculated based on all or more than one type of end node. Depending on how the calculation is performed, the above thresholds may also differ in value. For example, when the randomness measure 322, 326, 332 and previous randomness measure 325, 330, 336 are calculated separately for each type of end node, the overall values may be smaller, so the thresholds may also be smaller in value. However, when the randomness measure 322, 326, 332 and the previous randomness measure 325, 330, 336 are calculated for all types of end nodes, the overall values may be larger, so the threshold may be larger in value.

Figure 11:
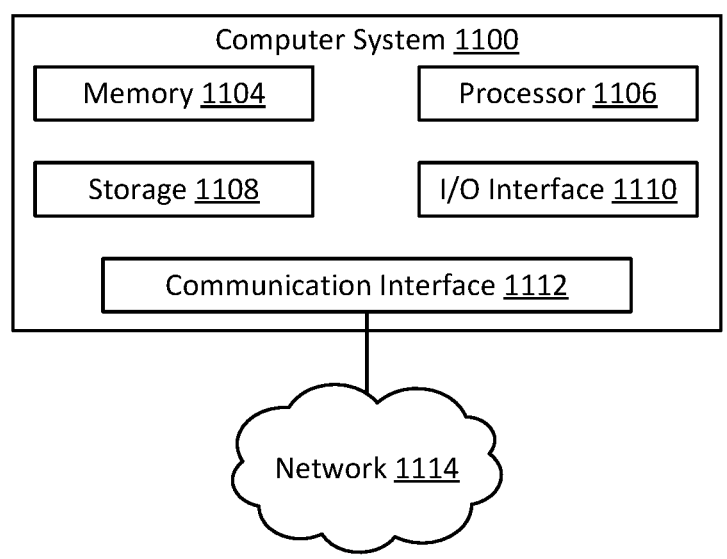
FIG. 11 illustrates a computer system according to an exemplary embodiment of the present disclosure.

FIG. 11 illustrates an example computer system 1100 that may be utilized to implement one or more of the devices and/or components of FIG. 3, such as the server 316 and/or the map data provider 302. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates the computer system 1100 taking any suitable physical form. As example and not by way of limitation, the computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1106, memory 1104, storage 1108, an input/output (I/O) interface 1110, and a communication interface 1112. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 1106 includes hardware for executing instructions, such as those making up a computer program. As an example and not by way of limitation, to execute instructions, the processor 1106 may retrieve (or fetch) the instructions from an internal register, an internal cache, memory 1104, or storage 1108; decode and execute the instructions; and then write one or more results to an internal register, internal cache, memory 1104, or storage 1108. In particular embodiments, the processor 1106 may include one or more internal caches for data, instructions, or addresses. This disclosure contemplates the processor 1106 including any suitable number of any suitable internal caches, where appropriate. As an example and not by way of limitation, the processor 1106 may include one or more instruction caches, one or more data caches, and one or more translation lookaside buffers (TLBs). Instructions in the instruction caches may be copies of instructions in memory 1104 or storage 1108, and the instruction caches may speed up retrieval of those instructions by the processor 1106. Data in the data caches may be copies of data in memory 1104 or storage 1108 that are to be operated on by computer instructions; the results of previous instructions executed by the processor 1106 that are accessible to subsequent instructions or for writing to memory 1104 or storage 1108; or any other suitable data. The data caches may speed up read or write operations by the processor 1106. The TLBs may speed up virtual-address translation for the processor 1106. In particular embodiments, processor 1106 may include one or more internal registers for data, instructions, or addresses. This disclosure contemplates the processor 1106 including any suitable number of any suitable internal registers, where appropriate. Where appropriate, the processor 1106 may include one or more arithmetic logic units (ALUs), be a multi-core processor, or include one or more processors 802. Although this disclosure describes and illustrates a particular processor, this disclosure contemplates any suitable processor.

In particular embodiments, the memory 1104 includes main memory for storing instructions for the processor 1106 to execute or data for processor 1106 to operate on. As an example, and not by way of limitation, computer system 1100 may load instructions from storage 1108 or another source (such as another computer system 1100) to the memory 1104. The processor 1106 may then load the instructions from the memory 1104 to an internal register or internal cache. To execute the instructions, the processor 1106 may retrieve the instructions from the internal register or internal cache and decode them. During or after execution of the instructions, the processor 1106 may write one or more results (which may be intermediate or final results) to the internal register or internal cache. The processor 1106 may then write one or more of those results to the memory 1104. In particular embodiments, the processor 1106 executes only instructions in one or more internal registers or internal caches or in memory 1104 (as opposed to storage 1108 or elsewhere) and operates only on data in one or more internal registers or internal caches or in memory 1104 (as opposed to storage 1108 or elsewhere). One or more memory buses (which may each include an address bus and a data bus) may couple the processor 1106 to the memory 1104. The bus may include one or more memory buses, as described in further detail below. In particular embodiments, one or more memory management units (MMUs) reside between the processor 1106 and memory 1104 and facilitate accesses to the memory 1104 requested by the processor 1106. In particular embodiments, the memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 804, where appropriate. Although this disclosure describes and illustrates particular memory implementations, this disclosure contemplates any suitable memory implementation.

In particular embodiments, the storage 1108 includes mass storage for data or instructions. As an example and not by way of limitation, the storage 1108 may include a hard disk drive (HDD), a floppy disk drive, flash memory, an optical disc, a magneto-optical disc, magnetic tape, or a Universal Serial Bus (USB) drive or a combination of two or more of these. The storage 1108 may include removable or non-removable (or fixed) media, where appropriate. The storage 1108 may be internal or external to computer system 1100, where appropriate. In particular embodiments, the storage 1108 is non-volatile, solid-state memory. In particular embodiments, the storage 1108 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1108 taking any suitable physical form. The storage 1108 may include one or more storage control units facilitating communication between processor 1106 and storage 1108, where appropriate. Where appropriate, the storage 1108 may include one or more storages 806. Although this disclosure describes and illustrates particular storage, this disclosure contemplates any suitable storage.

In particular embodiments, the I/O Interface 1110 includes hardware, software, or both, providing one or more interfaces for communication between computer system 1100 and one or more I/O devices. The computer system 1100 may include one or more of these I/O devices, where appropriate. One or more of these I/O devices may enable communication between a person and computer system 1100. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 1110 may include one or more device or software drivers enabling processor 1106 to drive one or more of these I/O devices. The I/O interface 1110 may include one or more I/O interfaces 1110, where appropriate. Although this disclosure describes and illustrates a particular I/O interface, this disclosure contemplates any suitable I/O interface or combination of I/O interfaces.

In particular embodiments, communication interface 1112 includes hardware, software, or both providing one or more interfaces for communication (such as, for example, packet-based communication) between computer system 1100 and one or more other computer systems 1100 or one or more networks 1114. As an example and not by way of limitation, communication interface 1112 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 1114 and any suitable communication interface 1112 for it. As an example and not by way of limitation, the network 1114 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1112 for any of these networks, where appropriate. Communication interface 1112 may include one or more communication interfaces 1112, where appropriate. Although this disclosure describes and illustrates a particular communication interface implementations, this disclosure contemplates any suitable communication interface implementation.

The computer system 1102 may also include a bus. The bus may include hardware, software, or both and may communicatively couple the components of the computer system 1100 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   receiving a new map dataset associated with operation of a vehicle, wherein the new map dataset includes a plurality of new map features relative to a previous map dataset;
   generating, based on the new map dataset, a knowledge graph comprising a plurality of nodes reflecting the plurality of new map features;
   determining one or more traversal paths along nodes and edges within the knowledge graph based on the plurality of nodes reflecting the plurality of new map features;
   generating, based on the one or more traversal paths within the knowledge graph, a first entropy score for the plurality of new map features;
   determining a second entropy score for a previous knowledge graph corresponding to the previous map dataset;
   generating a randomness difference between the knowledge graph and the previous knowledge graph by comparing the first entropy score with the second entropy score; and
   based on determining that the randomness difference satisfies a predetermined threshold, incorporating the plurality of new map features in generating a production map dataset.

2. The method of claim 1, further comprising:
   determining that a difference between a third entropy score of an additional map dataset and a fourth entropy score of the production map dataset fails to satisfy the predetermined threshold; and
   excluding an additional plurality of new map features from the production map dataset.

3. The method of claim 1, further comprising:
   receiving the new map dataset from a map data provider;
   determining an accuracy score corresponding to the map data provider based on the randomness difference between the first entropy score and the second entropy score; and
   generating, based on the accuracy score, an accuracy profile associated with the map data provider.

4. The method of claim 1, wherein generating a knowledge graph based on the new map dataset further comprises:
   identifying the plurality of new map features within the new map dataset;
   determining one or more relationships between the plurality of new map features;
   generating, for each of the plurality of new map features, a node in the knowledge graph; and
   generating, for each relationship of the one or more relationships, an edge between two corresponding nodes of the knowledge graph.

5. The method of claim 4, wherein the edges of the knowledge graph designate a relationship type of each relationship between connected nodes.

6. The method of claim 5, wherein the edge is stored as a triple comprising an identification of a first node connected by the edge, an identification of a second node connected by the edge, and a relationship type of a relationship between the first node and the second node.

7. The method of claim 1, wherein generating the first entropy score comprises determining information entropy between a starting node and an ending node for a traversal path of the one or more traversal paths.

8. A system comprising:
   one or more processors; and
   a memory coupled to the one or more processor, the memory comprising instructions, which when executed by the one or more processors, cause the system to:
   receive a new map dataset associated with operation of a vehicle, wherein the new map dataset includes a plurality of new map features relative to a previous map dataset;
   generate, based on the new map dataset, a knowledge graph comprising a plurality of nodes reflecting the plurality of new map features;
   determine one or more traversal paths along nodes and edges within the knowledge graph based on the plurality of nodes reflecting the plurality of new map features;
   generate, based on the one or more traversal paths within the knowledge graph, a first entropy score for the plurality of new map features;
   determine a second entropy score for a previous knowledge graph corresponding to the previous map dataset;
   generate a randomness difference between the knowledge graph and the previous knowledge graph by comparing the first entropy score with the second entropy score; and
   based on determining that the randomness difference satisfies a predetermined threshold, incorporate the plurality of new map features in generating a production map dataset.

9. The system of claim 8, wherein the memory comprises further instruction which, when executed by the one or more processors, cause the system to:

determine that a difference between a third entropy score of an additional map dataset and a fourth entropy score of the production map dataset fails to satisfy the predetermined threshold; and exclude an additional plurality of new map features from the production map dataset.

10. The system of claim 8, wherein the memory comprises further instructions which, when executed by the one or more processors, cause the system to:

receive the new map dataset from a map data provider;

determine an accuracy score corresponding to the map data provider based on the randomness difference between the first entropy score and the second entropy score; and generate, based on the accuracy score, an accuracy profile associated with the map data provider.

11. The system of claim 8, wherein the memory comprises further instructions which, when executed by the one or more processors cause the system to:

identify the plurality of new map features within the new map dataset;

determine one or more relationships between the plurality of new map features;

generate, for each of the plurality of new map features, a node in the knowledge graph; and generate, for each relationship of the one or more relationships, an edge between two corresponding nodes of the knowledge graph.

12. The system of claim 11, wherein the edges of the knowledge graph designate a relationship type of each relationship between connected nodes.

13. The system of claim 12, wherein the edge is stored as a triple comprising an identification of a first node connected by the edge, an identification of a second node connected by the edge, and a relationship type of a relationship between the first node and the second node.

14. The system of claim 8, wherein the memory comprises further instruction which, when executed by the one or more processors, cause the system to generate the first entropy score by determining information entropy between a starting node and an ending node for a traversal path of the one or more traversal paths.

15. A non-transitory computer readable storage medium comprising instructions that, when executed by one or more processors, cause the one or more processors to perform operations comprising:

receiving a new map dataset associated with operation of a vehicle, wherein the new map dataset includes a plurality of new map features relative to a previous map dataset;

generating, based on the new map dataset, a knowledge graph comprising a plurality of nodes reflecting the plurality of new map features;

determining one or more traversal paths along nodes and edges within the knowledge graph based on the plurality of nodes reflecting the plurality of new map features;

generating, based on the one or more traversal paths within the knowledge graph, a first entropy score for the plurality of new map features;

determining a second entropy score for a previous knowledge graph corresponding to the previous map dataset;

generating a randomness difference between the knowledge graph and the previous knowledge graph by comparing the first entropy score with the second entropy score; and based on determining that the randomness difference satisfies a predetermined threshold, incorporating the plurality of new map features in generating a production map dataset.

16. The non-transitory computer readable storage medium of claim 15, wherein the operations further comprise:

determining that a difference between a third entropy score of an additional map dataset and a fourth entropy score of the production map dataset fails to satisfy the predetermined threshold; and excluding an additional plurality of new map features from the production map dataset.

17. The non-transitory computer readable storage medium of claim 15, wherein the operations further comprise:

receiving the new map dataset from a map data provider;

determining an accuracy score corresponding to the map data provider based on the randomness difference between the first entropy score and the second entropy score; and generating, based on the accuracy score, an accuracy profile associated with the map data provider.

18. The non-transitory computer readable storage medium of claim 15, wherein the operations further comprise generating the knowledge graph based on the new map dataset by:

identifying the plurality of new map features within the new map dataset;

determining one or more relationships between the plurality of new map features;

generating, for each of the plurality of new map features, a node in the knowledge graph; and generating, for each relationship of the one or more relationships, an edge between two corresponding nodes of the knowledge graph.

19. The non-transitory computer readable storage medium of claim 18, wherein the edge is stored as a triple comprising an identification of a first node connected by the edge, an identification of a second node connected by the edge, and a relationship type of a relationship between the first node and second node.

20. The non-transitory computer readable storage medium of claim 15, wherein generating the first entropy score comprises determining information entropy between a starting node and an ending node for a traversal path of the one or more traversal paths.

* * * * *